United States Patent
Baldini et al.

(10) Patent No.: US 9,635,159 B2
(45) Date of Patent: Apr. 25, 2017

(54) METHOD AND APPARATUS FOR PROVIDING IMMERSIVE INTERACTION VIA EVERYDAY DEVICES

(75) Inventors: Diego Baldini, Berlin (DE); Steven Bauer, Victoria (AU); Steven James Rawlings, Southampton (GB)

(73) Assignee: Nokia Technologies Oy, Espoo (FI)

( * ) Notice: Subject to any disclaimer, the term of this patent is extended or adjusted under 35 U.S.C. 154(b) by 82 days.

(21) Appl. No.: 14/400,046

(22) PCT Filed: May 8, 2012

(86) PCT No.: PCT/CN2012/075168
§ 371 (c)(1),
(2), (4) Date: Nov. 10, 2014

(87) PCT Pub. No.: WO2013/166649
PCT Pub. Date: Nov. 14, 2013

(65) Prior Publication Data
US 2015/0111547 A1    Apr. 23, 2015

(51) Int. Cl.
*H04M 1/725*    (2006.01)
*G06F 3/01*    (2006.01)
(Continued)

(52) U.S. Cl.
CPC ........ *H04M 1/72527* (2013.01); *H04L 67/08* (2013.01); *H04L 69/18* (2013.01);
(Continued)

(58) Field of Classification Search
None
See application file for complete search history.

(56) References Cited

U.S. PATENT DOCUMENTS 3,059,519 A    10/1962 Stanton
4,542,291 A    9/1985 Zimmerman
(Continued)

FOREIGN PATENT DOCUMENTS

CN    101834856 A    9/2010
EP    1979801 A1    10/2008
(Continued)

OTHER PUBLICATIONS

"Majestic (Video Game)", Wikipedia, Retrieved on Jan. 8, 2016, Webpage available at : https://en.wikipedia.org/wiki/Majestic_(video_game).
(Continued)

*Primary Examiner* — Daniel Lai
(74) *Attorney, Agent, or Firm* — Ditthavong & Steiner, P.C.

(57) ABSTRACT

An approach is provided for providing immersive interaction via everyday devices based on one or more interaction events. In an example embodiment, an immersion service processes content presented at a device to determine one or more interaction events. The immersion service further determines (a) one or more control signals for controlling the device, one or more other devices, or a combination thereof to cause, at least in part, the one or more interaction events; (b) one or more protocols for transmitting the one or more control signals; or (c) a combination thereof. The immersion service also causes, at least in part, a transmission of the one or more control signals to the device, the one or more other devices, or a combination thereof.

22 Claims, 17 Drawing Sheets

(51) Int. Cl.
  *H04W 4/18* (2009.01)
  *H04L 29/06* (2006.01)
  *H04W 8/22* (2009.01)
  *H04W 56/00* (2009.01)
  *H04L 29/08* (2006.01)
  *H04W 88/06* (2009.01)

(52) U.S. Cl.
  CPC ............... *H04W 4/18* (2013.01); *H04W 8/22* (2013.01); *H04W 56/001* (2013.01); *G06F 3/011* (2013.01); *H04W 88/06* (2013.01)

(56) References Cited

U.S. PATENT DOCUMENTS

| | | | |
|---|---|---|---|
| 5,440,326 | A | 8/1995 | Quinn |
| 5,898,421 | A | 4/1999 | Quinn |
| 6,088,017 | A | 7/2000 | Tremblay et al. |
| 6,215,498 | B1 | 4/2001 | Filo et al. |
| 6,275,213 | B1 | 8/2001 | Tremblay et al. |
| 6,280,327 | B1 | 8/2001 | Leifer et al. |
| 6,424,333 | B1 | 7/2002 | Tremblay et al. |
| 6,850,221 | B1 | 2/2005 | Tickle |
| 6,878,066 | B2 | 4/2005 | Leifer et al. |
| 2002/0097267 | A1 | 7/2002 | Dinan et al. |
| 2003/0103088 | A1* | 6/2003 | Dresti ............ G06F 3/0481 715/835 |
| 2007/0050360 | A1 | 3/2007 | Hull et al. |
| 2007/0184899 | A1 | 8/2007 | Rantapuska |
| 2007/0260687 | A1* | 11/2007 | Rao ............... H04L 12/1827 709/204 |
| 2009/0210483 | A1* | 8/2009 | Pierce ............ A63F 13/12 709/203 |
| 2010/0005480 | A1 | 1/2010 | Mallempati et al. |
| 2010/0008265 | A1 | 1/2010 | Freer |
| 2010/0030578 | A1* | 2/2010 | Siddique ......... G06Q 10/0637 705/3 |
| 2010/0199228 | A1 | 8/2010 | Latta et al. |
| 2010/0313146 | A1* | 12/2010 | Nielsen ............ G06T 19/006 715/757 |
| 2011/0016497 | A1 | 1/2011 | Bloom et al. |
| 2011/0055715 | A1 | 3/2011 | Kim et al. |
| 2011/0107329 | A1 | 5/2011 | Betzler et al. |
| 2011/0138317 | A1 | 6/2011 | Kang et al. |
| 2011/0221962 | A1 | 9/2011 | Khosravy et al. |
| 2011/0238751 | A1* | 9/2011 | Belimpasakis ......... G06F 3/011 709/204 |
| 2012/0105447 | A1* | 5/2012 | Kim ............... H04N 21/42226 345/419 |

FOREIGN PATENT DOCUMENTS

| | | |
|---|---|---|
| EP | 1998565 A1 | 12/2008 |
| JP | 2001-157282 A | 6/2001 |
| JP | 2002-063505 A | 2/2002 |
| JP | 2004-127226 A | 4/2004 |
| JP | 2004-135051 A | 4/2004 |
| JP | 2006-201912 A | 8/2006 |
| JP | 2010-050630 A | 3/2010 |
| KR | 100836882 B1 | 6/2008 |
| KR | 2009-0093366 A | 9/2009 |
| WO | 99/34327 A2 | 7/1999 |
| WO | 2009/102308 A1 | 8/2009 |

OTHER PUBLICATIONS

"Alternate Reality Game", Wikipedia, Retrieved on Jan. 4, 2016, Webpage available at : https://en.wikipedia.org/wiki/Alternate_reality_game.

"13th Street Interactive Movie", The Digital Stew, Retrieved on Jan. 4, 2016, Webpage available at : http://blog.thedigitalstew.com/?p=1230.

Extended European Search Report received for corresponding European Patent Application No. 12876375.2, dated Dec. 4, 2015, 7 pages.

Office action received for corresponding Japanese Patent Application No. 2015-510592, dated Jan. 20, 2016, 4 pages of office action and 3 pages of office action translation available.

International Search Report and Written Opinion received for corresponding Patent Cooperation Treaty Application No. PCT/CN2012/075168 dated Feb. 14, 2013, 10 pages.

Office Action for corresponding Japanese Patent Application No. 2015-510592, dated Sep. 29, 2016, English Language Summary included, 4 pages.

Office Action for corresponding Chinese Patent Application No. 201280074235.4, dated Oct. 8, 2016, English-Language summary included, 11 Pages.

* cited by examiner

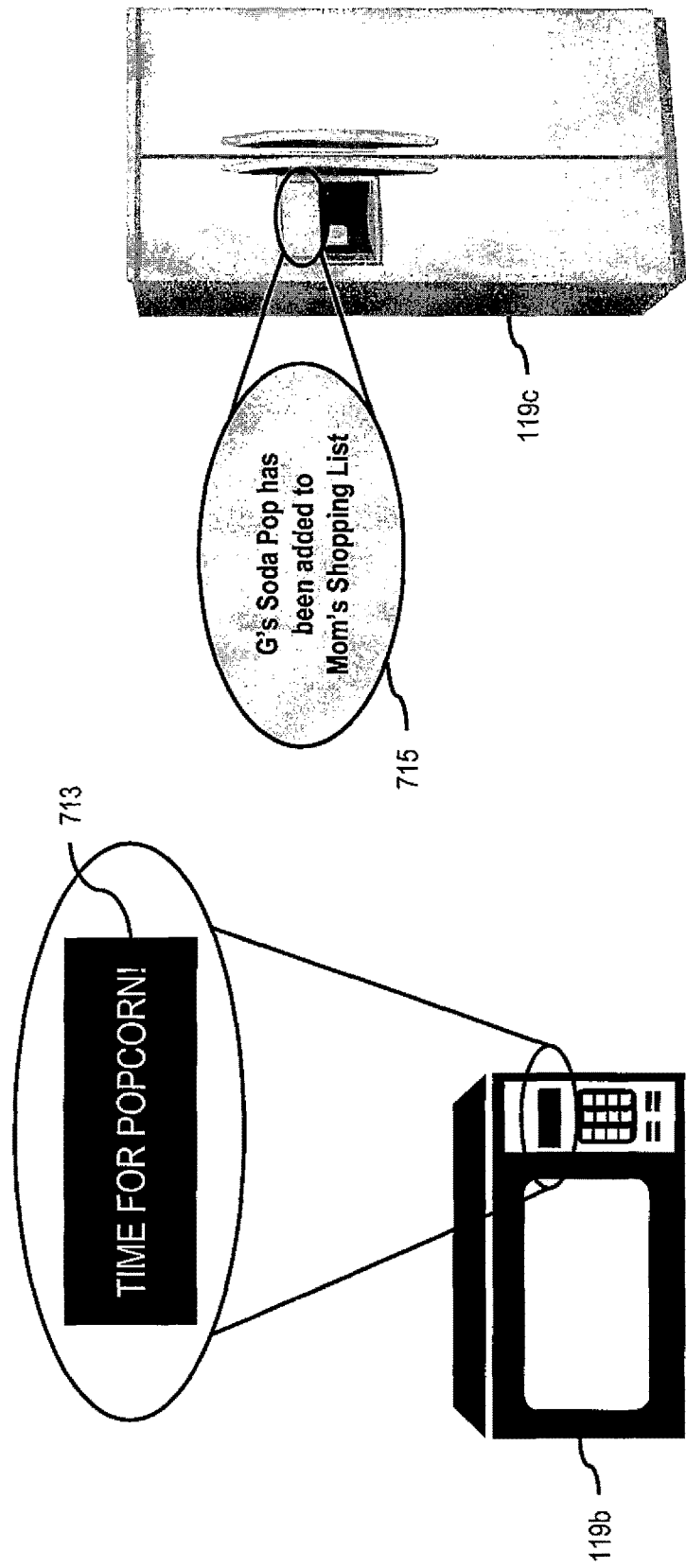

METHOD AND APPARATUS FOR PROVIDING IMMERSIVE INTERACTION VIA EVERYDAY DEVICES

RELATED APPLICATION

This application was originally filed as Patent Cooperation Treaty Application No. PCT/CN2012/075168 filed May 8, 2012.

BACKGROUND

Service providers and device manufacturers (e.g., wireless, cellular, etc.) are continually challenged to deliver value and convenience to consumers by, for example, providing compelling services. Service providers and device manufacturers are also continually challenged by content providers to deliver new ways for consumers to experience content. One area of interest to service providers, device manufacturers and content providers is providing a more realistic experience for consumers when consuming content. For example, device manufacturers have developed devices (e.g., televisions, projectors, mobile phones, etc.) that are able to present multimedia content (e.g., movies, television programming, etc.) to consumers such that the consumers visualize the content in three dimensions. Further, certain movie theaters may present movies that consumers perceive in three dimensions in addition to tactile interactions with the consumers, such as vibrations and/or sprays of fluids (e.g., air, water, etc.). Additionally, manufacturers have developed devices that consumers may use to interact with the presentation of content that simulate real world devices. For example, many video games are associated with special devices, such as rifles, golf clubs, motion sensing controllers, that simulate one or more real world devices that are represented in the game. Content providers have similarly developed content to interact with the simulated devices. However, to experience such perceived increase in realism, consumers must, for example, purchase specialized equipment (e.g., three-dimensional compatible displays, simulated devices, etc.) or go to specialized theaters that have specially formatted movies and/or specially configured equipment. Yet, even with the specialized equipment, the content does not use the reality around the user and does not interact with the user personally. For example, when a user is participating with a game, even if participating with a device that simulates a real world device, the user is not psychologically immersed into the game. The user still understands the difference between playing the game and the real world outside of the game. Thus, the user is not psychologically immersed into the content, at least in part, because the content is not interacting with everyday devices associated with the user. Therefore, the consumer is not fully immersed in the content. Accordingly, service providers, device manufacturers and content providers face significant challenges in immersing consumers in content that interacts with consumers personally using everyday devices associated with the consumers.

SOME EXAMPLE EMBODIMENTS

Therefore, there is a need for an approach for providing immersive interaction via everyday devices based on one or more immersive interaction events.

According to one embodiment, a method comprises processing of content presented at a device to determine one or more immersive interaction events. The method also comprises determining (a) one or more control signals for controlling the device, one or more other devices, or a combination thereof to cause, at least in part, the one or more immersive interaction events; (b) one or more protocols for transmitting the one or more control signals; or (c) a combination thereof. The method further comprises causing, at least in part, a transmission of the one or more control signals to the device, the one or more other devices, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to process content presented at a device to determine one or more immersive interaction events. The apparatus is also caused to determine (a) one or more control signals for controlling the device, one or more other devices, or a combination thereof to cause, at least in part, the one or more immersive interaction events; (b) one or more protocols for transmitting the one or more control signals; or (c) a combination thereof. The apparatus is further caused to transmit the one or more control signals to the device, the one or more other devices, or a combination thereof.

According to another embodiment, a computer-readable storage medium carries one or more sequences of one or more instructions (e.g., one or more computer programs) which, when executed by one or more processors, cause, at least in part, an apparatus to process content presented at a device to determine one or more immersive interaction events. The apparatus is also caused to determine (a) one or more control signals for controlling the device, one or more other devices, or a combination thereof to cause, at least in part, the one or more immersive interaction events; (b) one or more protocols for transmitting the one or more control signals; or (c) a combination thereof. The apparatus is further caused to transmit the one or more control signals to the device, the one or more other devices, or a combination thereof.

According to another embodiment, an apparatus comprises means for processing of content presented at a device to determine one or more immersive interaction events. The apparatus also comprises means for determining (a) one or more control signals for controlling the device, one or more other devices, or a combination thereof to cause, at least in part, the one or more immersive interaction events; (b) one or more protocols for transmitting the one or more control signals; or (c) a combination thereof. The apparatus further comprises means for causing, at least in part, a transmission of the one or more control signals to the device, the one or more other devices, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 7A-7I are diagrams of user interfaces utilized in the processes of FIGS. 3-6, according to various embodiments;

DESCRIPTION OF SOME EMBODIMENTS

Examples of a method, apparatus, and computer program for providing immersive interaction via everyday devices based on one or more immersive interaction events are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
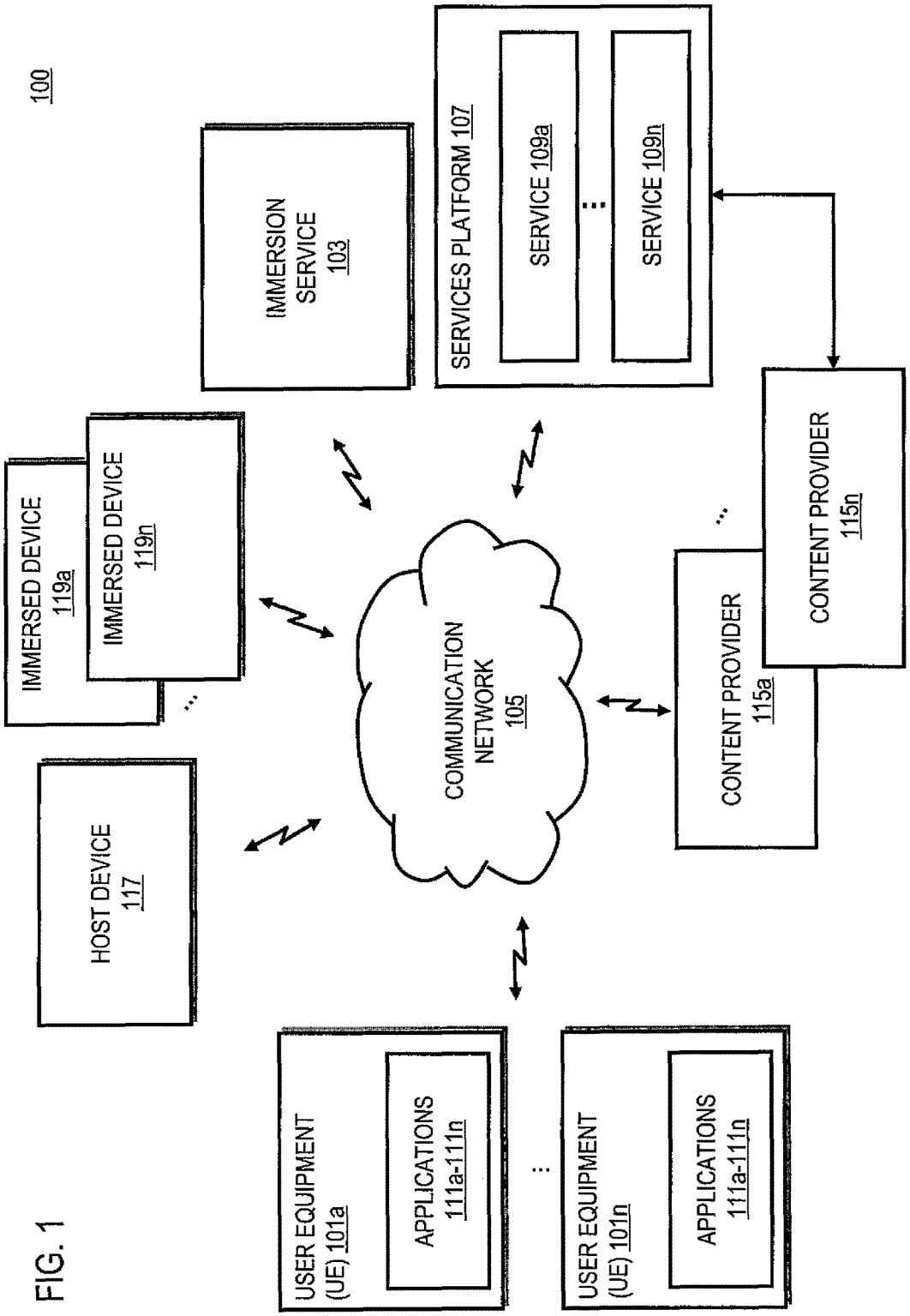
FIG. 1 is a diagram of a system capable of providing immersive interaction via everyday devices based on one or more immersive interaction events, according to one embodiment.

FIG. 1 is a diagram of a system capable of providing immersive interaction via everyday devices based on one or more immersive interaction events, according to one embodiment. As discussed above, service providers and device manufacturers seek to provide a more realistic experience to users when presenting content to the users. Such content may be any type of content presented to a user, such as a movie, a television show, a song, a computer game, other videos (e.g., exercise videos, training videos, educational videos, etc.), and the like. Service providers and device manufacturers have developed the ability to increase the realism experienced by users when presented with the content. For example, device manufacturers have developed the ability to display images on devices that users perceive three-dimensionally to make the images more realistic. Certain service providers, such as movie theaters, combine such three-dimensional presentation of content with other sensory feedback, such as tactile feedback using, for example, vibrations and/or sprays of air or water. Thus, service providers and device manufacturers have developed more realistic ways for users to experience visual, audio and tactile sensory feedback.

Despite these advances, users still understand that such sensory feedback is not real. Users understand that the perceived three-dimensions associated with a display are merely an illusion. For increased realism that includes, for example, tactile feedback, users still must go to specially equipped movie theaters to experience the three-dimensional movies with the additional sensory feedback. Such movie theater settings take away from the users' experiences because the users must experience the content with the other users in the theater. Thus, the experience is not personal. The experience does not interact with the users' individual spaces. Thus, the users are not fully immersed into the experience provided by the content.

Further, when consuming certain types of content, the content may be associated with one or more devices specifically made for the content to interact with the content. However, because the devices are specially made for the content, the devices often only work with the content and have no other use. Even further, some devices are intended to simulate real world devices, such as game controllers that are in the shape of a guitar or rifle. Although the devices are visually similar, the visual similarity is the extent of the similarities and the devices have no other functionality beyond being associated with the presentation of content. For example, the devices do not represent everyday devices that have functionality that is not specific to the presentation of content. Thus, although the users may be able to use devices that are visually similar to real world devices the devices are imitating, the users do not experience a full psychological relationship with the content through the device. There is no psychological relationship between the user and the device because, for example, the user is using a device specifically made for the content rather than a device that may be used in the real world independently from the presentation of the content or that the user uses on a daily basis. Accordingly, service providers and device manufacturers face significant challenges in fully immersing users in presentations of content. There are significant challenges that must be overcome to personalize user's experiences associated with consuming content while limiting the additional specialized equipment necessary to achieve such personalized experiences.

To address these problems, a system 100 of FIG. 1 introduces the capability to provide immersive interaction via everyday devices based on one or more immersive interaction events. The system 100 enables content (e.g., a movie, a song, a television program, a computer game, a video, etc.) to interact with a user. The system 100 provides for the control of one or more devices associated with a user and/or associated with an environment associated with a user via one or more control signals sent via one or more protocols. The one or more control signals are associated with one or more immersive interaction events within the content. The devices may represent any type of everyday device is that able to accept one or more control signals via the one or more protocols. The devices may be everyday devices that are otherwise unrelated to the presentation of the content, such that the devices have functionality beyond functionality associated with presenting the content. However, the term everyday device does not require that the device is used every day. By way of example, an everyday device that has functionality beyond functionality associated with presenting content may be a washing machine, a dishwasher, a microwave oven, a toaster, a radio, a clock, etc. In one embodiment, the one or more devices may include devices that present the content but otherwise have functionality unrelated to presenting the content. By way of example, the devices may have various different components that may be otherwise unrelated to presenting the content and may be controlled based on the one or more commands and/or control signals. For instance, modern mobile phones have increased functionality beyond merely making phone calls such that the mobile phones may now present content, such as movies, videos, music, and the like. However, functionality of the mobile phones, such as the call functionality, is still unrelated to the functionality of presenting the content. The protocols may be, for example, Bluetooth®, WLAN, radio, or any other protocol discussed herein (e.g., one or more protocols discussed with respect to the communication network 105). Thus, the system 100 enables the ability to detect one or more devices that are not specifically configured or associated with the presentation of content, or use one or more other components in a device that is presenting content but are otherwise unrelated to the presentation of the content, and immerse the devices into the presentation of content. By immersing the devices into the presentation of content, the system 100 provides the ability to immerse the user into the presentation of the content by associating the content with the devices surrounding the user.

In one embodiment, content presented by one or more devices may include, for example, metadata associated with one or more immersive interaction events. In one embodiment, content presented by one or more devices may include, for example, explicit code instructions that are created dynamically and dependent on the devices within the system 100 based on one or more immersive interaction events. The system 100 may determine the one or more immersive interaction events based on the presence of the metadata within the content and/or the explicit code. The system 100 may further process the immersive interaction events to determine what devices within the system 100 are compatible with the immersive interaction events. Based on the presence of one or more compatible devices within the system 100, the system 100 may transmit one or more control signals to the devices using one or more protocols to cause the devices to perform the functionality and/or action associated with the metadata, explicit code, and/or immersive interaction event within the content. Accordingly, the system 100 may immerse the devices within the content based on the immersive interaction events and a determination of what devices are associated with such events.

The system 100 may further immerse the content into the one or more devices to create a symbiotic relationship between the content and the one or more everyday devices. The system 100 allows for the transmittal and/or retrieval and display of information from the content to one or more user interfaces on the devices. The users of the devices may then interact with one or more representations of the content of the displays of the devices to interact with the content. Thus, the users may use their everyday devices to interact with the content to create a fully immersed experience. By way of example, interacting with the native user interfaces of a device allows a user to interface with one or more representations of the content, and thereby interact with the content. Because the users are interacting with the user interfaces of their everyday devices, the users become fully immersed in the content.

By way of example, while playing a movie on a DVD player connected to a television, one or more actions, one or more functions, and/or one or more characteristics may occur within the movie that are associated with a mobile phone represented in the movie. For instance, a character within the movie may receive a phone call on their mobile phone and their mobile phone may ring. The system 100 provides the capability to cause a mobile phone associated with a user watching the movie to receive a phone call, and therefore have their mobile phone ring at the same time the mobile phone rings in the movie. The system 100 further allows the mobile phone of the user to display information regarding the call that corresponds to the information within the movie. For example, if the character Robert Morris is calling a character in the movie, the user's device may display that the incoming call is from Robert Morris. Further, if the user subsequently looks at his contacts application, he may see an entry associated with the character Robert Morris. Thus, the system 100 allows for a personalized experience for a user enjoying content by immersing the user into the content using one or more everyday devices associated with the user that otherwise are not associated with presenting the content and have functionality beyond presenting the content. For instance, in the above example, where the DVD player and the television are presenting the movie, the mobile phone is an everyday device that is used for other actions and/or other functions besides presenting the movie. Thus, when the user receives a phone call on the mobile phone, the user will treat the phone call as any other phone call and perceive the phone call as being part of the real world rather than associated with the virtual world of the movie.

The system 100 may further create multiple immersion levels, or nested immersion levels, where levels of content may be immersed within other levels of content. Thus, the system 100 may immerse a user into multiple levels of virtual reality through the immersion of a device in multiple levels of content. By way of example, while experiencing content associated with walking through a virtual simulation of a city (e.g., New York) that is related to one level of immersion, a user may execute an augmented reality application. The system 100 may immerse the user and the augmented reality application such that the application is immersed within the virtual simulation of the city. Thus, although the user is not actually in the city, but is instead within a virtual simulation of the city, the augmented reality application is immersed within the virtual simulation and respond as if actually present in the city. Thus, the user may be fully immersed within the experience or content of the virtual simulation by being able to interact with the augmented reality application. The same experience may be achieved with, for example, multiple games that are immersed within different levels. For instance, one level of immersion may have the user and the device within a zero-gravity world based on certain content (e.g., a video game, virtual world, etc.). The second level of immersion may have a computer game that responds as if being played in the zero-gravity world in response to the first level of immersion. Further, the various levels of immersion may be oblivious to each other by the immersion service 103 executing the immersion levels independently.

By way of another example, the devices that are immersed within the content may be thought of as more than an everyday device, but can be considered a device that a user uses on a daily basis to gain extra-sensory perception of their surrounding environment or extend their senses. The system 100 allows content to interact with these devices and distort the extra senses that these devices provide to the user to immerse the user in a virtual world. The system 100 further allows for multiple levels of immersion to even further augment and/or distort senses of the user received through the devices. By way of example, a user may be playing a video game on their device. The video game may be related to, for instance, a flight simulation. Within the video game the user may be traveling at a high rate of speed (e.g., Mach 1). If the user executes a second application, such as another game, the system 100 may execute the second application as if the second application is executed within the virtual world created by the first application. Thus, the extra senses gained by the second application may be relative to the conditions or immersion caused by the first application. For example, the second application may detect that the user and/or the device is traveling at a high rate of speed, as if the user and/or device are being put in high gravitational-force conditions. Thus, the system 100 allows for nested immersion experiences. Accordingly, as discussed below, each immersion experience can be a standalone immersion experience or be a nested immersion experience in one or more immersion experiences. For instance, reality may be considered as dimension 1 and an immersive reality may be considered as dimension 2 through dimension N, where N represents the number of nested immersion experiences.

Further, where the system 100 provides for nested a immersion experience by combining immersion experiences, the system 100 provides for the ability for the immersion experiences to interact using the normal communication and/or interfacing channels. Thus, an immersed state can be provided to third-party applications through the normal platform interfaces. By way of example, where location is involved in immersion experiences, the third-party application may receive location information, although constituting immersed location information, from the regular platform that provides location information in an immersed device, such as, for example, the GPS. Thus, because the third-party applications receive immersion information from the normal platforms associated with the information, the third-party applications may be unaware of the immersion experience.

By way of another example, a user may be using their mobile phone to present content, such as watching a movie on their mobile phone. The presentation of the movie on the mobile phone may otherwise not normally interface or use other components of the phone, such as the ringer. However, the system 100 provides the ability to detect of one or more immersive interaction events within the presentation of the movie and to interface with the ringer on the mobile phone such that, for example, when a mobile phone rings within the movie, the ringer of the actual mobile phone used to present the movie also rings. The ringer may ring by the system 100 determining the one or more immersive interaction events within the content, determining one or more controls signals associated immersive interaction event and the ringer within the mobile phone, and executing the one or more control signals upon the ringing in the presentation of the movie.

The system 100 allows for the configuration of any type of device that is compatible with or one or more controls signals and/or protocols used to transmit the control signals. The system 100 further allows for the association with any number of devices that may or may not be associated with control signals specific to specific content. Thus, although a user may know the devices that are compatible with one or more controls signals and/or protocols, the user is unaware of the immersive interaction events within the content and the specific devices that the system will interact with. The resulting surprise effect adds to the realism of the presentation of the content and aids in immersing the user into the content. Further, different environments may be associated with different devices. Thus, the experience realized in one environment may be different than the experience realized in a different environment based on the different associated devices. For instance, a user that brings a movie to a friends house, which is associated with different devices than the user's house, will experience a different immersion associated with the content based on the different devices. Under this approach, the system 100 allows for non-standardized experiences associated with the content. Thus, unlike certain movie theaters that provide a standardized experience associated with, for example, a three-dimensional movie in addition to extra sensory feedback (e.g., tactile feedback), the system 100 allows for non-standardized experiences that may vary based on the number and type of devices that are associated by way of the system with the presentation of the content.

Further, the same type of devices with different feature may provide different immersion experiences. For example, an advanced mobile phone may have many features that content may interact with to immerse the user of the advanced mobile phone into the content. A less advanced mobile phone may have a limited number of extra features, or no extra features, that prevent the less advanced mobile phone from becoming fully immersed into the content. For instance, an advanced mobile phone may include location determination functionality (e.g., GPS) while the less advanced mobile phone may not. Accordingly, the advanced mobile phone can display its location while the less advanced mobile phone cannot Thus, the advanced mobile phone can immerse the user within the content, in part, by displaying a virtual location of the user and the advanced mobile phone. However, the less advanced mobile phone cannot immerse the user within the content by displaying a virtual location. Thus, different types of devices (e.g., mobile phone, dishwasher, microwave oven, light switch, etc.) can provide different immersion experiences as well as different devices within the same type of device (e.g., different mobile phones with different functionality, etc.) can similarly provide different immersion experiences based on the features the different devices within the same type of device support.

The system 100 further enables the ability to insert one or more representations of one the content into the device, one or more other devices, or a combination thereof. The one or more devices may then be used to interact with the content. The one or more devices may be associated personally with a user. Thus, the interactions between the content and the devices immerse the user in the content. Further, the system enables to ability to augment the experiences associated with a user's device that is otherwise unrelated to the presentation of content, or one or more components of a device that are otherwise unrelated to the presentation of the content, to immerse the user in a presentation of the content. The immersion may be based, at least in part, on the combination of information associated with the content with information that is native to the user's device. Such native information may be information that was present on the device prior to the device being associated with the content by the system 100. Such a combination makes the user unable to perceive what information on the device is native to the device and what information is based on the content to further immerse the user in the content. The system 100 further allows for the ability to interact with a virtual environment created by the content using the user's existing device that may otherwise be unrelated to the presentation of the content. Such interactions may be based on the same functions associated with the device based on interactions the user would perform in the real world, yet the functions instead interact with a virtual world created by the content. Such an enablement allows the user to bring the content into their devices to enhance a psychological immersion experience of the user within the content. In one embodiment, the system 100 allows for content to query information from the immersed devices (e.g., the everyday device) to further the immersion experience. The queried information obtained from the immersed devices may then be used and/or incorporated into the content. By way of example, an immersed device may include an ambient light sensor. The system 100 allows for the content to query the device for the value of the ambient light. Based on this information, the system 100 allows for an augmentation of the content based on the ambient light value from the immersed device. For instance, a virtual world skyline could be created to match the light coming through the window at the location the user is viewing the content, which is based on the value obtained from the ambient light sensor. By providing the ability for content to obtain information from the immersed devices, the system 100 further allows for the immersion of a user into content according to the characteristics of the surroundings of the user.

As shown in FIG. 1, the system 100 comprises user equipment (UE) 101a-101n (collectively referred to as UE 101) having connectivity to an immersion service 103 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, near field communication (NFC), Internet Protocol (IP) data casting, digital radio/television broadcasting, satellite, mobile ad-hoc network (MANET), and the like, or any combination thereof.

The UE 101 is any type of mobile terminal, fixed terminal, or portable terminal including a mobile handset, station, unit, device, mobile communication device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

The UE 101 may include one or more applications 111a-111n (collectively referred to as applications 111). The applications 111 may be any type of application, such as one or more gaming applications, one or more multimedia applications (e.g., movie player, music player, etc.), and the like. In one embodiment, an application 111a may interface with the immersion service 103 for associating the UE 101 with the presentation of content. The application 111a may also interact with the immersion service 103 to effectuate one or more events between the content and the UE 101, as discussed in detail below. Thus, in one embodiment, the UE 101 may act as one or more devices immersed within the content. The UE 101 may also act as one or more devices that present the content.

The system 100 may also include a host device 117 that has connectivity to the UE 101 and the immersion service 103 through the communication network 105. Although illustrated as one device in FIG. 1, the system 100 may include one or more host devices 117. In one embodiment, the host device 117 has connectivity directly to the UE 101 through one or more wired and/or wireless connections. The host device 117 may be associated with presenting the content to the user. By way of example, the host device 117 may be a DVD player that plays a movie, a gaming console that plays a game, etc. The host device 117 may also include a combination of devices that are used for presenting content to a user. For example, the host devices may be a DVD player in combination with a television and stereo equipment for presenting both visual and audio content to the user. In one embodiment, the host device 117 may be a UE 101a that is used to present content to a user. For example, the UE 101a may be presenting content, such as a game or a movie, and one or more other devices within the system 100 may be immersed within the content. In one embodiment, the host device 117 may present streamed content that is streamed from, for example, one or more services 109 and/or content providers 113, discussed below. By way of example, the content may be presented as streamed content using the Digital Video Broadcasting-Handheld (DVB-H) format. The host device 117 may present the streamed content signal and the UE 101a may be immersed into the streamed content. In one example, the streamed content may be presented as content broadcasted on a real world broadcasting channel or station (e.g. TV, radio, internet radio). Further, in one embodiment, the content that a UE 101a and/or user is immersed into may further cause other content to be streamed to the immersed UE 101a. By way of example, where the content in which a UE 101a is immersed into is a massively multiplayer online role-playing game (MMORPG), the content may cause other content, such as television programming broadcasted on a real world broadcasting channel, to be streamed to the immersed UE 101a. Thus, a user of the UE 101a may be immersed in an immersion experience created by the content (e.g., the MMORPG) but be experiencing real-world content (e.g., the television programming) through the immersed UE 101a. In such an embodiment, the user is effectively experiencing immersed real-world content.

The system 100 may also include one or more immersed devices 119a-119n (collectively referred to as immersed devices 119) that have connectivity to the UE 101, the immersion service 103, and the host device 117 through the communication network 105. In one embodiment, the immersed devices 119 may be directly connected to the host device 117 through one or more wired and/or wireless connections. The immersed devices 119 may be any type of device that can interact with the host device 117, the UE 101, and the immersion service 103. By way of example, the immersed devices 119 may be a light/light switch, a washing machine, a fan, a microwave oven, a wrist watch, a refrigerator, a dishwasher, etc. The immersed devices 119 may interact with the host device 117, the immersion service 103 and the UE 101 via any type of protocol, such as Bluetooth, WLAN, radio, etc., or any other protocol described herein with respect to, for example, the communication network 105. In one embodiment, the UE 101 may represent an immersed device 119 by way of the UE 101 being immersed within the presentation of content. Thus, the UE 101 may, in one embodiment, represent a specific type of immersed device 119. In one embodiment, the UE 101, or any immersed device 119, may also represent the host device 117. By way of example, a UE 101a may present content, such as a movie, and thus correspond to a host device. The UE 101a may also be immersed within the content based on immersive interaction events determined by the system 100 within the content. For example, one or more components associated with the UE 101a may be associated with presenting the content. One or more other components associated with the UE 101a may otherwise not be related to presenting the content, but may be controlled based generally on the content, such as the ringer of a mobile phone being controlled by one or more control signals based on one or more immersive interaction events within the content.

In one embodiment, one or more representations of content may be combined with one or more immersed devices 119 such that the content may be inserted into the devices. Accordingly, the one or more immersed devices 119 may interact with the content by receiving information from the content and sending one or more responses back to the content through one or more user interactions with the content. By way of example, an immersed device 119d may be a washing machine. The content may include one or more immersive interaction events associated with the washing machine. Based on the one or more control signals determined based on the immersive interaction events within the content, the washing machine may respond with one or more responses that interact with the content, such as when the content is an instructional video that interacts with one or more actions at the washing machine.

The UE 101 may also have connectivity to a services platform 107 through the communication network 105. The services platform 107 may include one or more services 109a-109n (collectively referred to as services 109). The services platform 107 may provide one or more services 109 to the UE 101, the immersion service 103, the content providers 115, and the host device 117. The services 109 may be associated with gaming services, multimedia services, social networking services, etc. In one embodiment, one or more services 109 may be associated with one or more functions associated with the immersion service 103.

The UE 101 may also have connectivity to one or more content providers 115a-115n (collectively referred to as content providers 115) through the communication network 105. The content providers 115 may provide content to the UE 101, the immersion service 103, the services 109 of the services platform 107, and the host device 117. The content may be any type of content, such as content associated with the presentation of content to a user from a host device 117 to an immersed device 119 and/or UE 101.

The immersion service 103 may enable the control over one or more devices associated with a user based on the determination of one or more immersive interaction events associated with content presented to the user. Although illustrated as a separate component of the system 100 in FIG. 1, the immersion service 103 and/or any one or more of the functions of the immersion service 103 may be embodied in one or more of the elements of the system 100. By way of example, in one embodiment, the immersion service 103 may be embodied in a host device 117 that executes the presentation of content. In one embodiment, the immersion service 103 may be embodied in one or more immersed devices 119 (including one or more UE 101) and/or in one or more services 109. However, the immersion service 103 may also be a distinct element of the system 100 that interacts with any of the other elements of the system 100.

The immersion service 103 enables content to interact with an environment associated with a user. The immersion service 103 processes content presented at a device to determine one or more immersive interaction events. The device that presents the content may be, for example, a host device 117 and/or a UE 101a that act as, for example, a movie player, an audio player, etc. The one or more other devices may include one or more UE 101 (including the UE 101 presenting the content) and/or one or more immersed devices 119. The content may include, for example, one or more movies, one or more videos, one or more television programs, one or more songs, one or more games, etc. The immersion service 103 further determines (a) one or more control signals for controlling the device and/or one or more other devices to cause the one or more immersive interaction events, and/or (b) one or more protocols for transmitting the one or more control signals. As discussed above, the protocols may be, for example, Bluetooth®, WLAN, radio, or any other protocol discussed herein. The immersion service 103 further causes a transmission of the control signals to the device and/or the one or more other devices to immerse the devices within the presentation of the content. The control over the devices causes the users that are associated with the devices to become immersed in the presented content, thereby attaining a more realistic experience. The immersion service 103 includes one or more application programming interfaces (API) for associating one or more actions, one or more functions, and/or one or more characteristics in the content presented by the device with the device and/or the one or more other devices. The API of the immersion service 103 further allows the content to initiate one or more events on the device and/or the one or more other devices, as well as listen and receive responses to the events from the device and/or the one or more other devices.

The immersion service 103 determines the supported control signals, the supported protocols, or a combination thereof between a device that presents content (e.g., a host device 117) and the device itself (e.g., one or more other components on the device) and/or one or more other devices that may be controlled based on the content (e.g., the UE 101, the immersed devices 119). The immersion service 103 may perform such a determination when initially associated with an environment, upon receiving information associated with a presentation of content, periodically regardless of receiving information associated with a presentation of content, on demand, or a combination thereof. Upon determining the control signals and protocols associated with the host device and the immersed devices, the immersion service 103 may configure any environment for a more personalized experience.

The immersion service 103 further determines virtual devices represented within the presentation of the content. The one or more virtual devices correspond to the UE 101 and/or the immersed devices 119 in the real world. By way of example, the content may be associated with a movie and a scene during the movie may have lights turn on. Thus, the lights or a light switch associated with the lights represents a virtual device associated with the content. The content may include one or more actions, functions, and/or characteristics associated with the virtual devices. The immersion service 103 may cause a synchronization of the actions, the functions, the characteristics, or a combination thereof of the one or more virtual devices with an execution of one or more control signals at the device and/or the one or more other devices such that the virtual devices in the content are synchronized with the immersed devices 119 (e.g., immersed devices 119 and/or UE 101) in the real world.

In one embodiment, a device immersed within the content may have the content inserted into the device. The immersion service 103 may control the insertion of the content into the device. The device may then be used to interact with the content. The immersion service 103 may then determine one or more interactions the content and the one or more devices. The interactions allow the content to interact with the device and allow the device to interact with the content by responding to one or more immersive interaction events within the content. The immersion service 103 may process the one or more interactions.

In one embodiment, the immersion service 103 may cause a combination of data from the content with data native to the one or more devices such that the data from the content is indistinguishable from data native to the devices. Under this approach, a user cannot tell what is real (e.g., native to the device) and what is virtual (e.g., data from the content). Thus, the user is fully immersed into the content using the user's own, everyday device. By way of example, data from the content is displayed alongside data native to the device within the user interface of the device. Accordingly, when the user views the user interfaces, such as a contacts user interface, the user cannot tell what contacts are native to the device, and therefore native to the real world, and what contacts are native to the content, and therefore native to the virtual world associated with the content.

In one embodiment, the immersion service 103 may further cause a generation of one or more user interfaces at the immersed devices for presenting information generated by the content, the one or more engines generating the content, or a combination thereof based on the controls signals. The immersion service 103, by causing a generation of the user interfaces, may reproduce the user interfaces normally experienced with the devices such that the interactions between the user and the device based on the generated user interfaces are indistinguishable from interactions between the user and user interfaces native to the device. In other words, the user is unable to determine whether the user is interacting with information pertaining to the real world on the device or information pertaining to the virtual world associated with content. This achieves a psychological immersion associated with the content and makes the immersion personalized to the user by using the user's own device.

In one embodiment, an immersed device 119a may request information from the content based on one or more immersive interaction events and/or responses to one or more immersive interaction events. By way of example, an immersed device 119a may send a message to the host device 117 presenting the content to request information to augment within the user interface of the immersed device 119a. The requested information may then be transmitted to the immersed device 119a and be displayed on a user interface associated with the immersed device 119a. When the association between an immersed device 119a and the content ends, any augmentation of the immersed device 119a may end such that the device returns to its original state before the association. By way of example, where the content is a movie played by a DVD player, when the movie stops, the association between the DVD player and the immersed device 119a may end, which may result in the augmentation of the immersed device 119a ending. Accordingly, any information that the immersed device 119a may have retrieved or had access to from the content may be lost such that the augmentation is ended. In one embodiment, although the connection between a host device 117 and, for example, an immersed device 119a may end, the immersion service 103 may still be in communication with the immersed device 119a to cause the immersed device 119a to end the augmentation of the information within the immersed device 119a.

In one embodiment, the immersive interaction events and/or control signals sent to the device and/or the one or more other devices may be associated with the content in such a way as to generate advertisements related to the content. By way of example, where the content represents a movie, one or more product placements associated with the movie may be associated with one or more commands directed to one or more devices. For example, a device that may be controlled by the immersion service 103 based on the content may be a refrigerator. Thus, when a product is presented in the movie, such as when a beverage brand is included in the movie, the beverage brand may automatically have their product associated with the refrigerator, such as having the product placed in an electronic shopping list associated with the refrigerator.

By way of example, the UE 101, the immersion service 103, the services platform 107, the content providers 115, the host device 117, and the immersed device 119 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
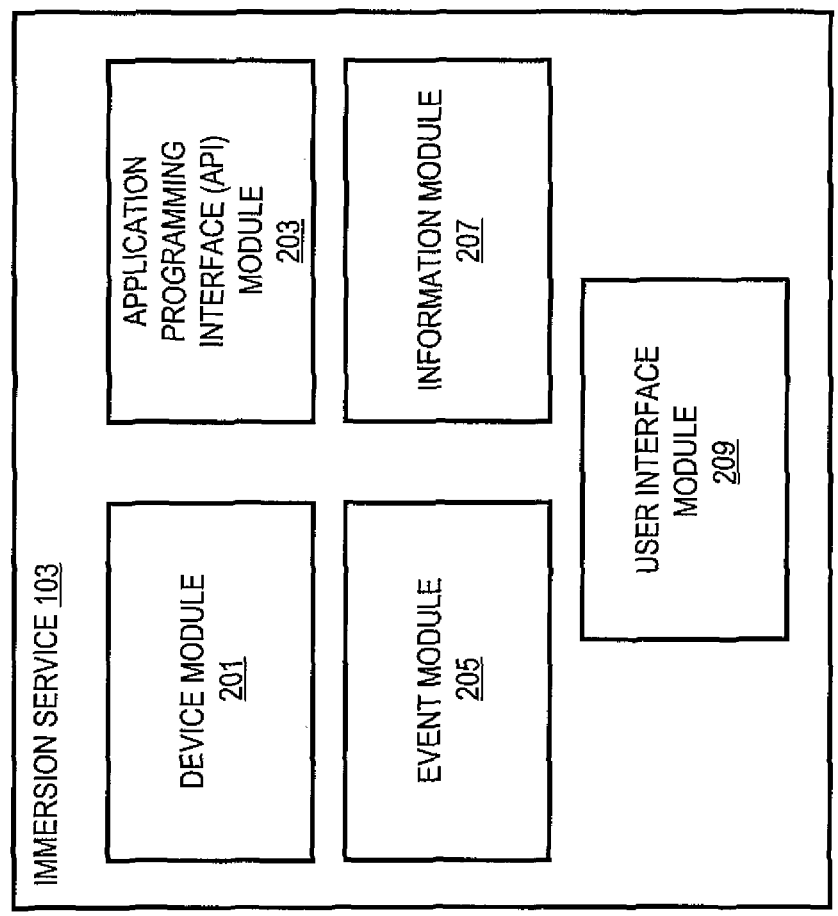
FIG. 2 is a diagram of the components of a immersion service, according to one embodiment.

FIG. 2 is a diagram of the elements of the immersion service 103, according to one embodiment. By way of example, the immersion service 103 includes one or more elements for providing immersive interaction via everyday devices based on one or more immersive interaction events. It is contemplated that the functions of these elements may be combined in one or more elements or performed by other elements of equivalent functionality. As discussed above, the functions of these components may be combined in one or more of the host device 117, the UE 101, the immersed devices 119, and/or services 109 on the services platform 107. Thus, by way of example, the functions of the immersion service 103 may be performed by a service 109a on the services platform 107 that is in communication with a host device 117 and an immersed device 119a. Alternatively, the functions of the immersions platform 103 may be performed by an application executed on the immersed device 119a. In this embodiment, the immersion service 103 includes a device module 201, an API module 203, an event module 205, an information module 207 and a user interface module 209.

The device module 201 determines the devices associated with a presentation of content. The device module 201 determines the one or more host devices 117 that present content to a user. In one embodiment, as discussed above, the immersion service 103 may be embodied in the host device 117. In which case, the device module 201 does not need to determine the host device 117 associated with presenting content to a user. The device module 201 also determines one or more other devices that may be controlled by the host device 117, such as one or more UE 101, the host device 117 itself, and/or one or more immersed devices 119. The device module 201 may determine the one or more other devices via any method for detecting devices. By way of example, the device module 201 may determine the one or more supported protocols and/or supported control signals between the host device and the one or more other devices to determine the associated devices. Thus, the method for determining the devices may be based on the one or more protocols used for transmitting information between the devices.

The API module 203 provides the link between the host device 117 and one or more other devices that are controlled by the host device 117 based on the immersive interaction events within the content. The API module 203 provides interfaces to the host device 117, the content presented on the host device 117, one or more engines generating the content, or a combination thereof for performing one or more interactions between the host device 117 and the one or more other devices. In one embodiment, the API module 203 may provide interfaces to the various components of the host device 117 presenting the content, such that the content may access one or more other components of the host device 117 to control based on the commands in the content. The API module 203 interfaces with the host device 117 for performing transactions on the one or more devices, as well as providing interfaces for listening for and receiving responses from the one or more devices. In one embodiment, the API module 203 interfaces with one or more applications 111 located on the UE 101 when one or more of the UE 101 are controlled by the content. The one or more applications 111 on the UE 101 similarly receive and send information pertaining to the UE 101 to the immersion service 103 via the API module 203. The applications 111 may initiate one or more actions, one or more functions, one or more characteristics, or a combination thereof associated with commands from the content at the UE 101. The applications 111 may also receive one or more responses to commands from one or more other applications 111 at the UE 101 in response to the commands. The applications 111 also may track the one or more transactions between the content and the other devices to determine what controls performed at the other devices relate to the content and what controls performed at the devices relate to native controls and/or native information. In which case, the applications 111 may determine whether the other devices should respond to the controls based on the native responses of the devices or based on the responses according to the content.

The event module 205 processes the content presented to a user to determine one or more immersive interaction events associated with the content. The event module 205 further correlates the one or more immersive interaction events to one or more control signals and/or one or more protocols associated with transmitting the control signals to one or more other devices, or one or more components of the immersed device. In one embodiment, the event module 205 synchronizes one or more actions, one or more functions, one or more characteristics, or a combination thereof associated with one or more virtual devices with an execution of the control signal at one or more immersed devices associated with the immersion service 103 based on the content. The event module 205 performs the synchronization such that the virtual device and the one or more immersed devices are synchronized, thereby making the action, the function, and/or the characteristic of the virtual device and the real device occur at the same time. The synchronization therefore causes the perception to the user that the user's device is immersed within the content, and therefore immerses the user in the content.

The information module 207 performs the functions of transmitting and tracking information that is passed to one or more devices when one or more devices are immersed within the content and/or when one or more representations of the content are immersed within the devices. As discussed above, information associated with the content may be combined with information that is native to one or more immersed devices 119. Accordingly, the information module 207 tracks the information that is transmitted between the one or more immersed devices and the host device presenting the content and/or the immersion service 103. In one embodiment, the information module 207 transmits information to the one or more devices controlled by the immersion service 103 as the devices request the information. In one embodiment, the information module 207 transmits all of the information in one transmission such that the device has all of the information needed to immerse the device in the virtual world associated with the content, as discussed in detail below.

In one embodiment, upon dissociation between the immersed device and a host device, the immersed device no longer is able to communicate with the host device presenting the content. Accordingly, the pathways used by the immersed device to retrieve information from the content no longer exist. Thus, the augmentation of the immersed device with virtual information from the content combined with native information to the device ends, and the immersed device no longer presents the virtual information. In one embodiment, the immersion service 103 may issue one or more commands to the one or more devices to delete the transmitted information. In such an embodiment, although a connection between a host device and a controlled device may be lost, the connection between the immersed device and the immersion service 103 may remain such that the immersion service 103 may continue transmitting commands to the immersed device.

In one embodiment, the user interface module 209 causes a combination information from the virtual environment of the content presented by the host device 117 with the native information of the immersed device 119a. The user interface module 209 may cause the combination of information by, for example, interfacing with one or more applications 111 associated with the immersed device 119a that generate the user interfaces at the immersed device 119a.

Figure 3:
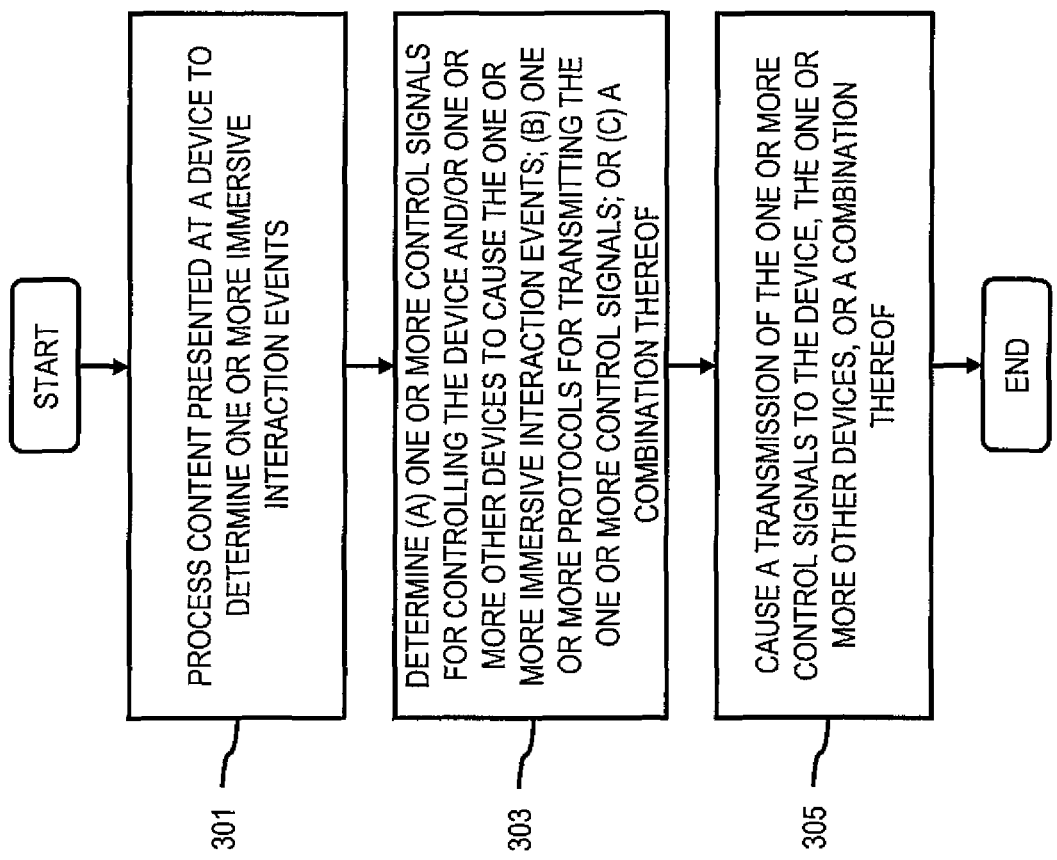
FIG. 3 is a flowchart of a process for providing immersive interaction via everyday devices based on one or more immersive interaction events, according to one embodiment.
Figure 9:
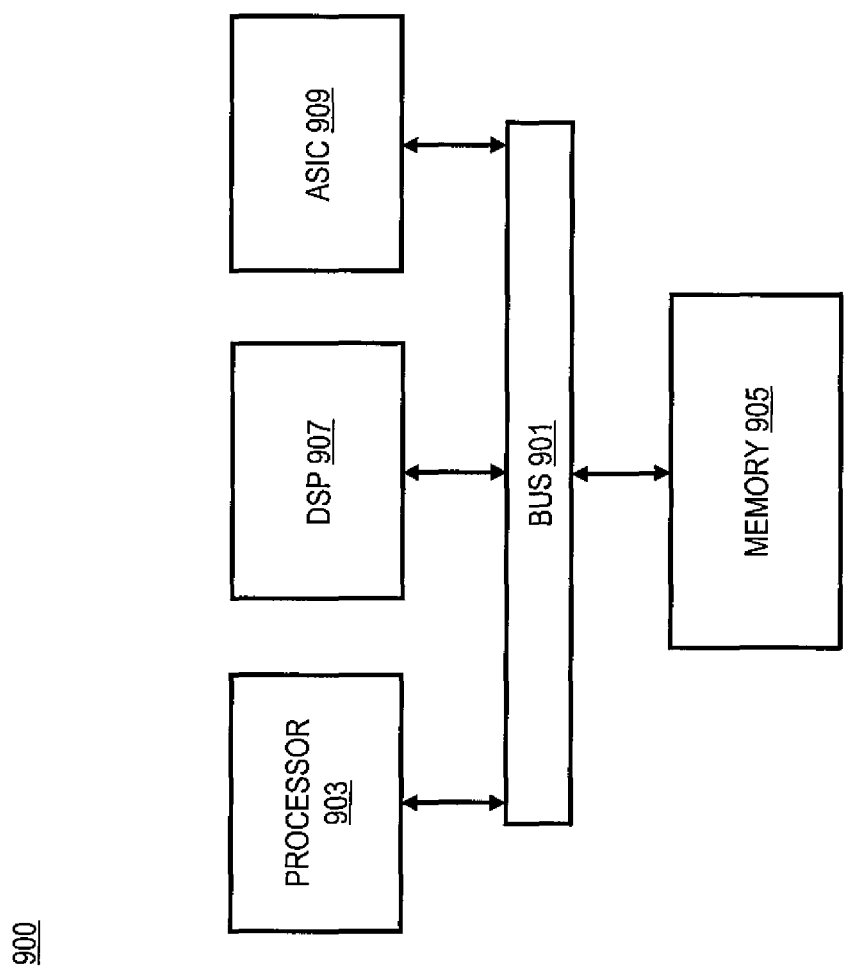
FIG. 9 is a diagram of a chip set that can be used to implement an embodiment of the invention.

FIG. 3 is a flowchart of a process for providing immersive interaction via everyday devices based on one or more immersive interaction events, according to one embodiment. In one embodiment, the immersion service 103 performs the process 300 and is implemented in, for instance, a chip set including a processor and a memory as shown in FIG. 9.

In step 301, the immersion service 103 processes content presented at a device to determine one or more immersive interaction events. The content can represent any type of content, such as movies, videos, music, television programs, etc. The device that presents the content may be considered a host device 117. By way of example, a movie may be played by a DVD player and the DVD player may be considered the host device 117. The movie may include one or more interactive immersive events associated with immersing one or more devices into the content. In one embodiment, the DVD player may process the information related to the movie to extract the information pertaining to the immersive interaction events within the information associated with the movie. In such an embodiment, the immersion service 103 may be embodied in the DVD player. In one embodiment, the information pertaining to the movie may be transmitted over the communication network 105 to the immersion service 103, which may then process the information associated with the movie to determine the one or more immersive interaction events. The immersive interaction events may be for immersing one or more devices into the content. The one or more devices may be any device that may be controlled by the content based on the one or more control signals. By way of example, the one or more devices may be the UE 101 and/or the immersed devices 119, or even the host device 117 where one or more other components are controlled by the commands. By way of specific examples, the one or more immersed devices 119 may be a microwave oven, a dishwasher, a washing machine, a refrigerator, a light switch, a wrist watch, a computer, a UE 101, or any device that is able to communicate with the immersion service 103 and/or the host device 117 via one or more protocols (e.g., Bluetooth®).

In step 303, the immersion service 103 determines (a) one or more control signals for controlling the device, one or more other devices, or a combination thereof to cause, at least in part, the one or more immersive interaction events; (b) one or more protocols for transmitting the one or more control signals; or (c) a combination thereof. The one or more controls signals may represent the one or more signals that are associated with the one or more devices that are controlled that effectuate the immersion of the one or more devices within the content. The one or more protocols are the protocols that are used to exchange the information pertaining to the one or more control signals at the one or more controlled devices. Based on this step, for example, the immersion service 103 is able to process the content presented by the host device 117 and determine one or more control signals that may be transmitted to one or more devices that are associated with the immersion service 103 for providing a more personalized experience when presenting the content. Because the immersion service 103 is able to determine the control signals and/or the protocols, that the immersion service 103 is able to interface with real world devices that may otherwise be unrelated to presenting the content and interface with these devices so that the devices present some type of information, whether audio, visual, tactile, or a combination thereof, related to the content to immerse the user associated with the devices into the content. Accordingly, a user does not need to obtain specialty equipment or travel to a service provider (e.g., movie theater) to be presented with a personalized experience that immerses the user in the content. Rather, the immersion service 103 may simply use the everyday devices within the environment of the user to immerse the devices, and the user, into the presented content.

In step 305, the immersion service 103 causes, at least in part, a transmission of the one or more control signals to the device, the one or more other devices, or a combination thereof. By transmitting the one or more control signals to the device (e.g., various other components of the device presenting the content that may, for example, otherwise be unrelated to presenting the content) or the one or more other devices, the immersion service 103 immerses the one or more devices into the content to immerse the user associated with the presentation of the content into the content.

Figure 4:
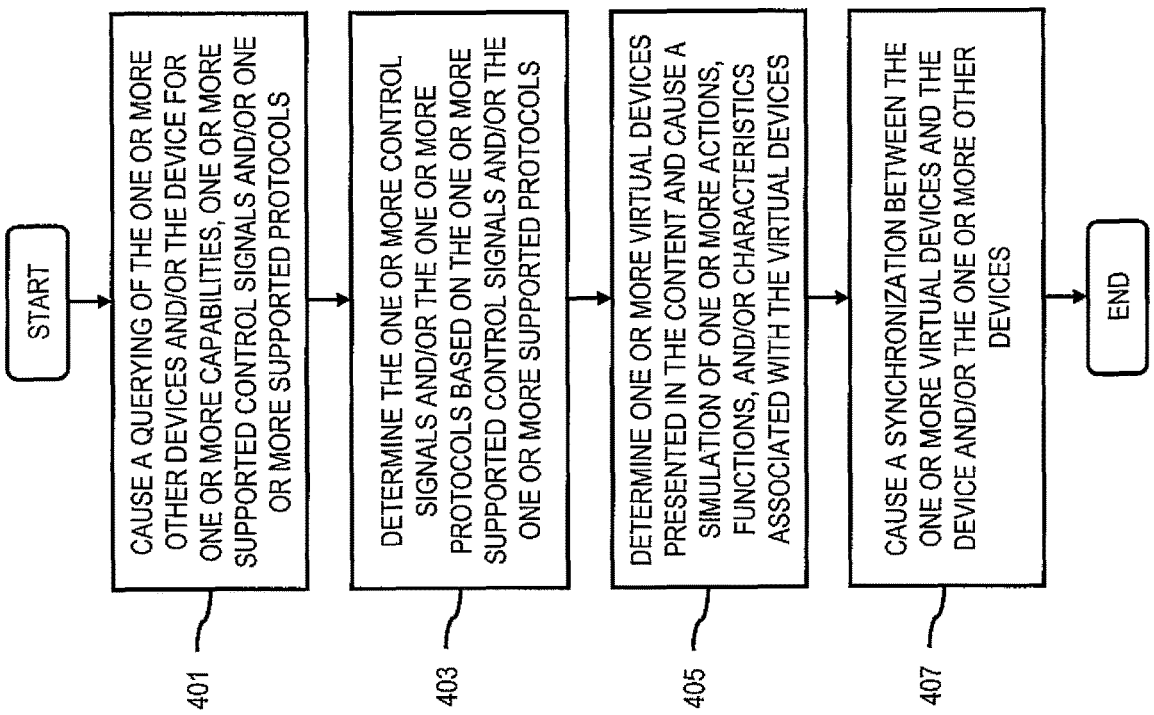
FIG. 4 is a flowchart of a process for determining devices to immerse into the presentation of content and synchronize with the content, according to one embodiment.

FIG. 4 is a flowchart of a process for determining devices to immerse into the presentation of content and synchronize with the content, according to one embodiment. In one embodiment, the immersion service 103 performs the process 400 and is implemented in, for instance, a chip set including a processor and a memory as shown in FIG. 9.

In step 401, the immersion service 103 causes, at least in part, a querying of the one or more other devices, the device, or a combination thereof for one or more capabilities, one or more supported control signals, one or more supported protocols, or a combination thereof. The immersion service 103 causes the querying to determine the environment associated with the device that presents the content and one or more other devices that may be controlled by the content. In one embodiment, the immersion service 103 may cause the querying once during an initial setup of the immersion service 103 with respect to a device presenting the content (e.g., host device 117). Thus, for example, upon the immersion service 103 detecting a new host device 117, the immersion service 103 may cause a query for supported control signals and/or supported protocols. In one embodiment, the immersion service 103 may cause the querying once upon the initial playback of content. Thus, for example, upon a host device 117 presenting specific content for the first time, such as the first time the host device 117 plays a specific movie, the immersion service 103 may cause a querying for supported control signals and/or supported protocols. In one embodiment, the immersion service 103 may cause the querying continuously, regardless of whether content is being presented or not, to determine the supported control signals and/or supported protocols, and any changes to the supported control signals and/or supported protocols that may occur over time. In one embodiment, the immersion service 103 may cause the querying upon command, such as from a host device 117, from one or more other devices (e.g., UE 101 and/or immersed devices 119), or based on one or more services 109.

By causing the querying for supported control signals and supported protocols, the immersion service 103 may be constantly aware of the capabilities of the host device 117 and the one or more other devices to determine what immersive interaction events associated with the content are supported by the host device and the one or more other devices. Thus, in step 403, the immersion service 103 determines the one or more controls signals, the one or more protocols, or a combination thereof used to control the one or more other devices according to the content based, at least in part, on the one or more supported control signals, the one or more supported protocols, or a combination thereof. Accordingly, the immersion service 103 can determine the immersive interaction events that are associated with the content that are supported by the host device 117 and the one or more other devices. If no devices are present that are supported by the immersive interaction events within the content, the immersion service 103 allows for the presentation of the content without immersing any device. If there are a large number of devices that may be controlled based on the supported control signals and the supported protocols, the immersion service 103 controls the devices based on the immersive interaction events in the content.

In step 405, the immersion service 103 determines one or more virtual devices presented in the content and cause, at least in part, a simulation of one or more actions, one or more functions, one or more characteristics, or a combination thereof associated with the one or more virtual devices at the device, the one or more other devices, or a combination thereof based, at least in part, on the one or more control signals. The one or more virtual devices may correspond to any of the devices that are associated with the immersion service 103. However, the virtual devices are virtual because they exist in the content. By way of example, a movie may include a scene associated with a light switch, such as where a character in the movie turns off lights using the light switch. Accordingly, the virtual device is the virtual light switch in the movie. The virtual devices may correspond to one or more devices controlled by the immersion service 103. For example, a light switch associated with the real world may be able to communicate with the immersion service 103 based on a supported control signal and/or a supported protocol. The immersion service 103 will make an association between the virtual light switch and the real world light switch such that, when the movie comes to a point where there is a action, function, or characteristic associated with the virtual light switch, the immersion service 103 causes the real world light switch to simulate the action, function, and/or characteristic associated with the virtual light switch. Accordingly, the user associated with the presentation of the content, such as the movie, is immersed in the content by having a light switch associated with the real world simulate events associated with the virtual light switch in the movie. By way of example, during a horror movie where a villain turns of the lights, the immersion service 103 may turn off the lights in the real world associated with the user based on commands in the content and the association of the virtual lights and the real world lights.

In step 407, the immersion service 103 causes, at least in part, a synchronization of the one or more actions, the one or more functions, the one or more characteristics, or a combination thereof of the one or more virtual devices with an execution of the one or more control signals at the device (e.g., at the one or more other components of the device that are now controlled by the commands), the one or more other devices, or a combination thereof (e.g., the UE 101 and/or the immersed devices 119), or a combination thereof. The immersion service 103 causes the synchronization such that the user perceives the action, the function, and/or the characteristic associated with the virtual device and the controlled device at the same time so that the user, for example, feels as if they are part of the content, rather than simply viewing the content.

Figure 5:
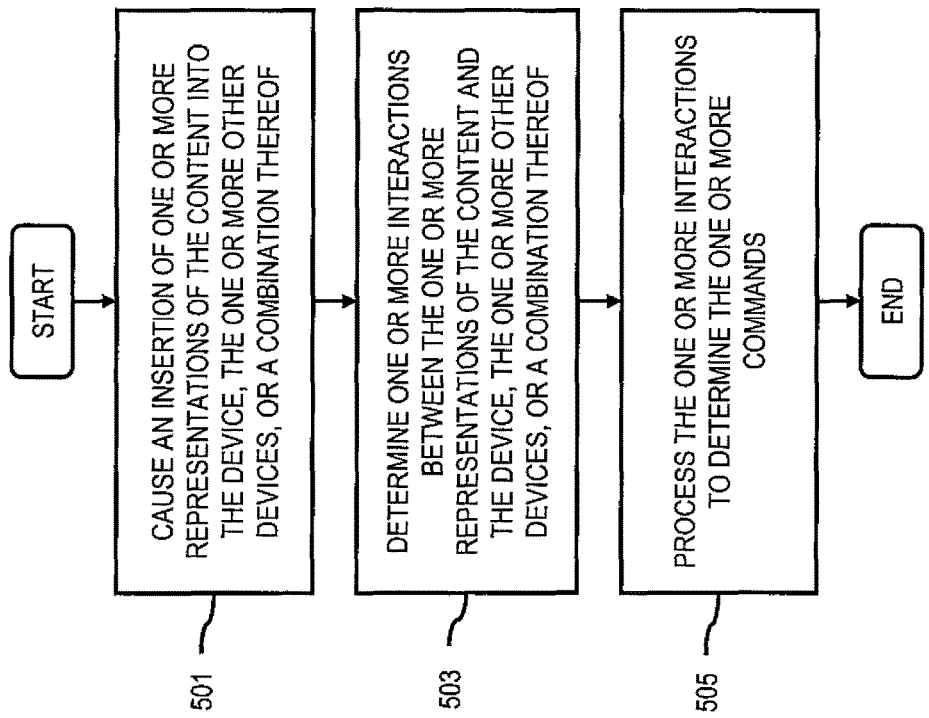
FIG. 5 is a flowchart of a process for inserting content into the one or more devices, according to one embodiment.

In one embodiment, the interaction between the content and one or more controlled devices may be more involved than merely causing an action, function, and/or characteristic associated with a virtual device occur at the same time as a real device. The interaction may involve multiple interactions that cause content to become immersed in the device, such that the user can, for example, interact with the content through the device. FIG. 5 is a flowchart of a process for inserting content into the one or more devices, according to one embodiment. In one embodiment, the immersion service 103 performs the process 500 and is implemented in, for instance, a chip set including a processor and a memory as shown in FIG. 9.

In step 501, the immersion service 103 causes, at least in part, an insertion of one or more representations of the content into the device, the one or more other devices, or a combination thereof. The insertion causes the content to be inserted into the one or more devices to become associated with the content such that the devices are able to interact with the content. By way of example, content may be inserted into the UE 101a based on the immersion service 103. Accordingly, the functions that may be normally be performed by the UE 101a, such as receiving communications (e.g., phone calls, text messages, multimedia messages, emails, etc.) may now be performed associated with the content or the real world. For instance, the user may still receive telephone calls from users not associated with the content. However, the user may also receive telephone calls from one or more virtual characters associated with the content. In such a case, if the content is associated with a game executed by a gaming console as the host device 117, the user may now receive phone calls from one or more non-players characters associated with the game content.

To effectuate the above, in step 503, the immersion service 103 determines one or more interactions between the one or more representations of the content and the device, the one or more other devices, or a combination thereof. The one or more interactions may be associated with the immersive interaction events initiating actions, functions, and/or characteristics associated with the one or more controlled devices. The one or more interactions may also be associated with the host device 117 receiving interactive responses to the initiated actions, functions, and/or characteristics from the one or more controlled devices (or the host device itself when one or more components of the host device are controlled). The transactions may also be associated with the one or more controlled devices initiating actions, functions, and/or characteristics associated with the one or more controlled devices associated with the content and/or one or more engines generating the content. Thus, the host device 117 and the one or more controlled devices may exchange information associated with immersing a user into content presented to the user to develop a more personalized experience for the user. In step 505, the immersion service 103 processes the one or more interactions associated with the content immersed within the devices in a symbiotic relationship to determine the immersive interaction events. The determined immersive interaction events may then be used to determine one or more additional control signals that may be used for interactions between the immersed device and the host device.

By way of example, where the host device is associated with a gaming console executing a game and one or the one or more other devices is a UE 101a, the interactions between the one or more representations of the content and the device allow for phone calls and/or text messages between the virtual game world and the real word, such as between one or more non-player characters associated with the game and the user associated with the UE 101a, navigating through the virtual world using one or more navigation applications on the UE 101a, browsing information associated with the content through a virtual Internet associated with the content, looking up non-player characters in a contacts application on the UE 101a, associating calendar applications 111 on the UE 101a with one or more events associated with the virtual world in the game, associating lists of activities to perform on the UE 101a with one or more activities associated with the virtual world in the game, and/or making notes specific to the virtual world in the game. Accordingly, based on the process 500, a user may use a device that has functionality beyond merely presenting content to interact with the content. By using a device that a user may already have that is not necessarily associated with the presentation of the content, the user may achieve a personalized experience with the content without having to purchase specialty equipment. Also, by interacting with a device (such as a UE 101) that the user may interact with on a daily basis, the user perceives even more of an immersion into the content.

Figure 6:
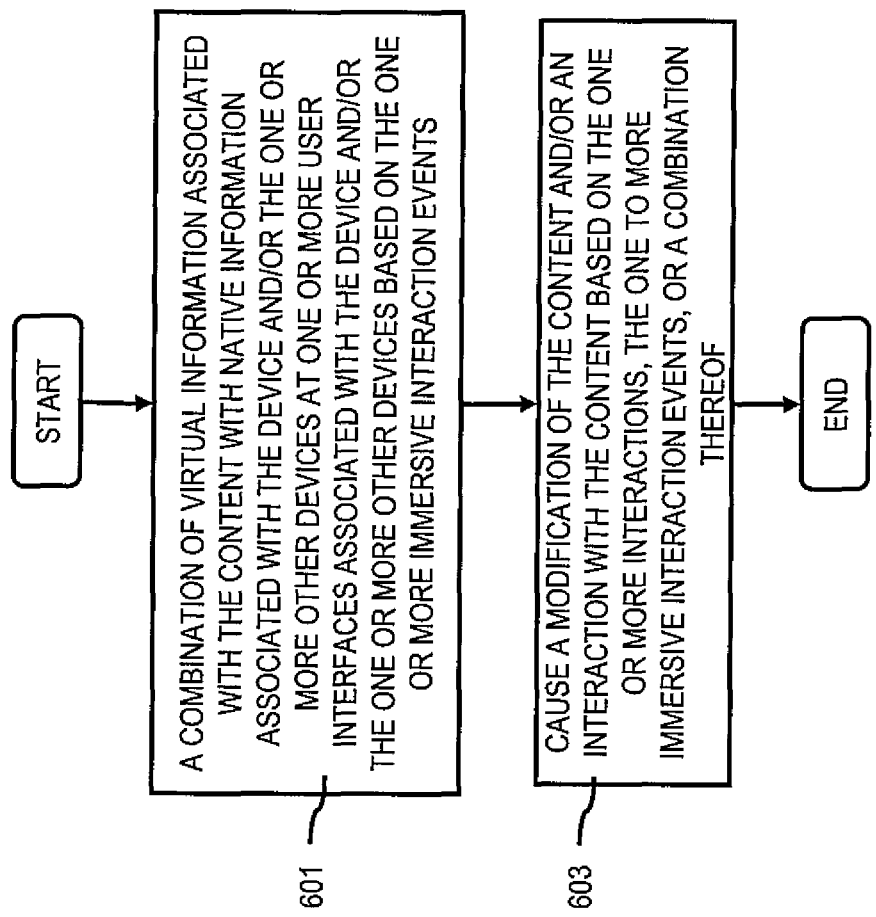
FIG. 6 is a flowchart of a process for combining information native to a device with information from content, according to one embodiment.

FIG. 6 is a flowchart of a process for combining information native to a device with information from content, according to one embodiment. In one embodiment, the immersion service 103 performs the process 600 and is implemented in, for instance, a chip set including a processor and a memory as shown in FIG. 9.

In step 601, the immersion service 103 causes, at least in part, a combination of virtual information associated with the content with native information associated with the device, the one or more other devices, or a combination thereof at one or more user interfaces associated with the device, the one or more other devices, or a combination thereof based, at least in part, on the one or more immersive interaction events. The content may include one or more immersive interaction events that cause the immersion service 103 to transmit information to the immersed device 119a associated with virtual information from the content. In response, the immersed device 119a may present the information on one or more user interfaces associated with the device as if the transmitted information is information native to the device rather than from the content. By way of example, virtual information associated with one or more contacts may be transmitted to the immersed device 119a based on an immersive interaction event associated with the content. The transmitted content may then be presented in the user interfaces associated with the device. Thus, when the user of the immersed device 119a opens an application 111b that displays contacts, for example, one or more of the contacts may be virtual contacts from the content. In one embodiment, an immersive interaction event may instead, for example, interact with the immersed device 119a such that information is not transmitted to the immersed device 119a until the device performs an action. For example, when a user of the immersed device opens an application 111a associated with displaying contacts, the immersed device 119a determines that an application is being started that will include information from the content. The immersed device 119a, therefore, may then request virtual information from the host device 117 presenting the content and/or from the immersion service 103. Upon receiving the virtual information, the immersed device 119a may display the information within the user interface associated with the application 111a for presenting the contacts. Where the device and/or the one or more other devices is a UE 101, the native information may represent, for example, contacts in a contacts application, bookmarks in a browser application, calendar events in a calendar application, or any other information that may be found on a UE 101a. The virtual information may similarly be one or more contacts, one or more bookmarks, one or more calendar events, etc. that are all associated with the virtual world associated with content.

The information may be transmitted to the device and/or the one or more other devices as needed, the information may be transmitted to the device and/or the one or more other devices upon an representation of the device being associated with the content, or a combination thereof. By way of example, the immersion service 103 may detect an execution of a contacts application on a UE 101a based on one or more notifications received from the UE 101a in response to the execution of the contacts application. The immersion service 103 may request basic information regarding the contacts associated with the content from the host device 117. The basic information may include, for example, only a name and/or a picture that may be viewed within a top menu of the contacts application. The host device 117 may then pass the contacts information to the immersion service 103, which may then pass the contacts information to the UE 101a. The contacts application at the UE 101a may then augment native data at the UE 101a with the information provided from the content to combine the virtual contacts information with the native contacts information. When the user of the UE 101a views contacts as provided by the contacts applications, the contacts will include native contacts associated with the real world and one or more virtual contacts associated with the content. Accordingly, the user interface associated with the contacts will look identical to the user interface associated with the native contacts application of the UE 101*a* such that the user is unable to determine what contacts are native contacts and what contacts are virtual contacts. Alternatively, the UE 101*a* (e.g., the immersed device 119*a*) may detect the execution of an application 111*a* that may request information associated with the content. The UE 101*a* may then request the information that will be used by the application 111*a* from the immersion service 103 and/or the host device 117 to be displayed on the user interface of the UE 101*a*. The requested information may then augment the information already on the UE 101*a* that is associated with the application 111*a*. By way of another example, all of the information pertaining to the virtual contacts (or any other information associated with the content) may be transmitted to the UE 101*a* upon the contacts application initially being executed at the UE 101*a*. By way of another example, all of the information pertaining to the virtual world associated with the content may be transmitted to the UE 101*a* upon an association between the UE 101*a* and a host device 117 associated with presenting the content.

As one alternative embodiment, the immersion service 103 may override native user interfaces on the one or more immersed devices with one or more user interfaces generated by the immersion service 103 that look identical to the native user interfaces. In one embodiment, the immersion service 103 may merge user interfaces to merge the native information and the information from the content. If the user selects one of the virtual contacts for additional information, a routing of information may occur such that the immersion service 103 requests the specific information associated with the virtual contact from the content and the specific information is passed to the UE 101*a*.

In step 603, the immersion service 103 causes, at least in part, a modification of the content, an interaction with the content, or a combination thereof based, at least in part, on the one or more interactions, the one to more immersive interaction events, or a combination thereof. Such interactions may be, for example, responses associated with interactions involving phone calls and/or text messages between a virtual game world and the real word, such as between one or more non-player characters associated with the game and the user associated with the UE 101*a*, navigating through the virtual world using one or more navigation applications on the UE 101*a*, browsing information associated with the content through a virtual Internet associated with the content, looking up non-player characters in a contacts application on the UE 101*a*, associating calendar applications 111 on the UE 101*e* with one or more events associated with the virtual world in the game, associating lists of activities to perform on the UE 101*a* with one or more activities associated with the virtual world in the game, and/or making notes specific to the virtual world in the game, as discussed above.

By way of example, a user may be viewing a movie presented by a DVD player acting as a host device. The DVD player may be controlling a mobile phone while presenting the content. A scene in the movie may include a virtual character directing the user to call a friend and tell the friend that the friendship is over. The scene may correspond with one or more commands that direct the mobile phone to listen for or detect one or more phone calls to a friend listed as a contact in the mobile phone. If the user uses the mobile phone to call the friend and performs the actions requested by the virtual character, the mobile phone may then respond to the DVD player with one or more responses indicating that the call was performed. In which case, the virtual character may respond based on the one or more responses from the mobile phone indicating the virtual character's approval of the user. If the user does not perform the action requested by the virtual character, the virtual character may respond differently, such as disparaging the user for not listening to instructions. Accordingly, the user is immersed in the content by being able to directly interact with the content. Because the user is using a device not otherwise associated with the presentation of the content (e.g., the mobile phone), the user feels even more immersed in the content.

Figure 7A:
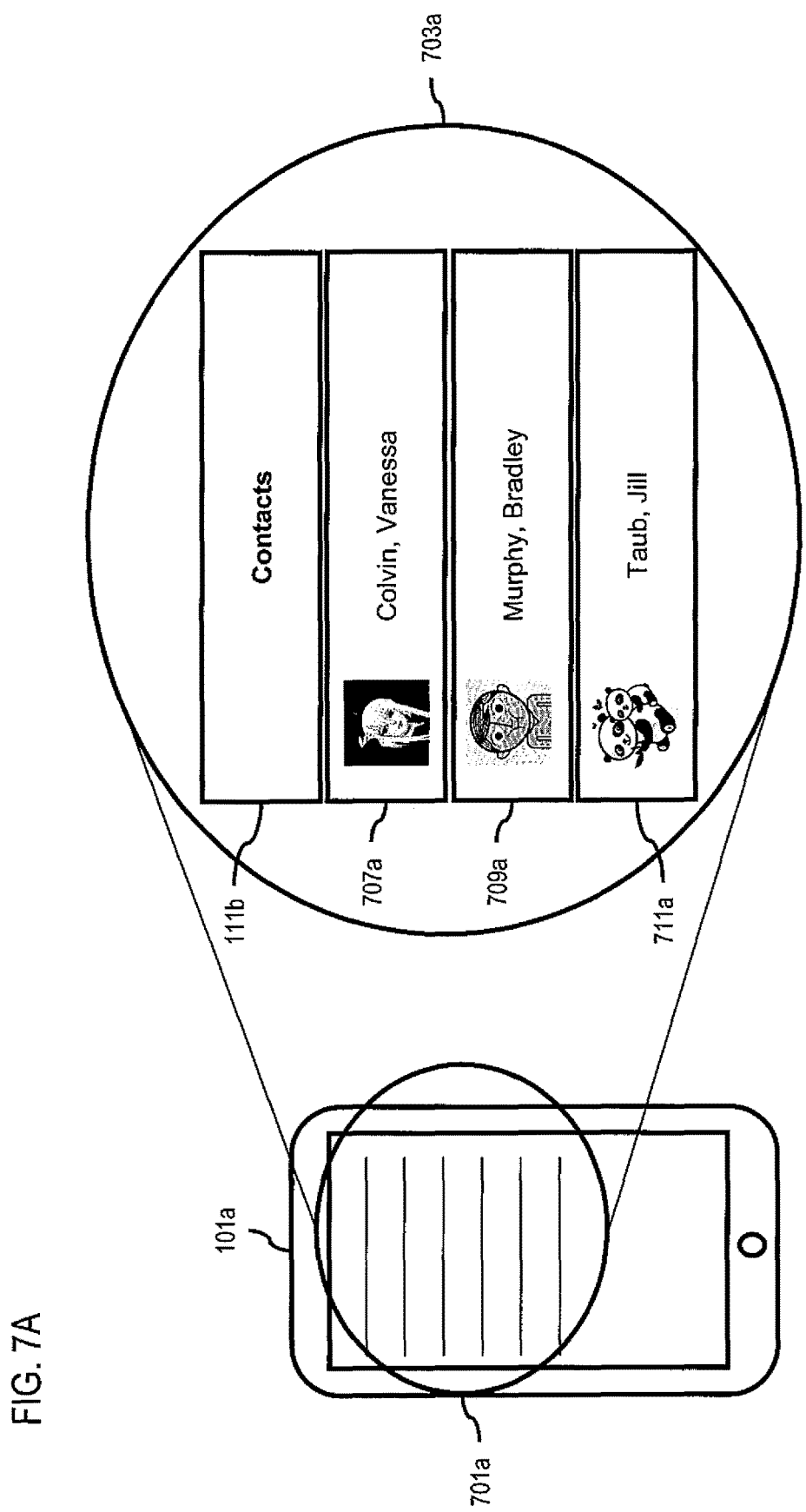

FIGS. 7A-7I are diagrams of user interfaces utilized in the processes of FIGS. 3-6, according to various embodiments. As illustrated in FIG. 7A, a UE 101*a* may be associated with a user interface 701*a* of a contacts application 111*b* that, as illustrated in the exploded view 703*a* of user interface 701*a*, includes contacts 707*a*, 709*a*, and 711*a*. The UE 101*a* may also be associated with content presented on another device (e.g., host device 117) such that information from the content may be presented on the UE 101*a*. By way of example, contacts 707*a* and 711*a* may be native contacts associated with the UE 101*a* prior to the UE 101*a* becoming associated with the content. However, contact 709*a* may be associated with a virtual character from the content, such as a non-player character if the content is associated with a game. As illustrated in the exploded view 703*a*, the various contacts 707*a*, 709*a*, and 711*a* are formatted identically and are indistinguishable except for the information they present. Thus, for example, there is no way for a user of the UE 101*a* to determine that the contact 709*a* is associated with a virtual character from the content based on the user interface 701*a*. The seamless integration of the contact 709*a* with the contacts 707*a* and 711*a* immerses the user of the UE 101*a* into the content.

Figure 7B:
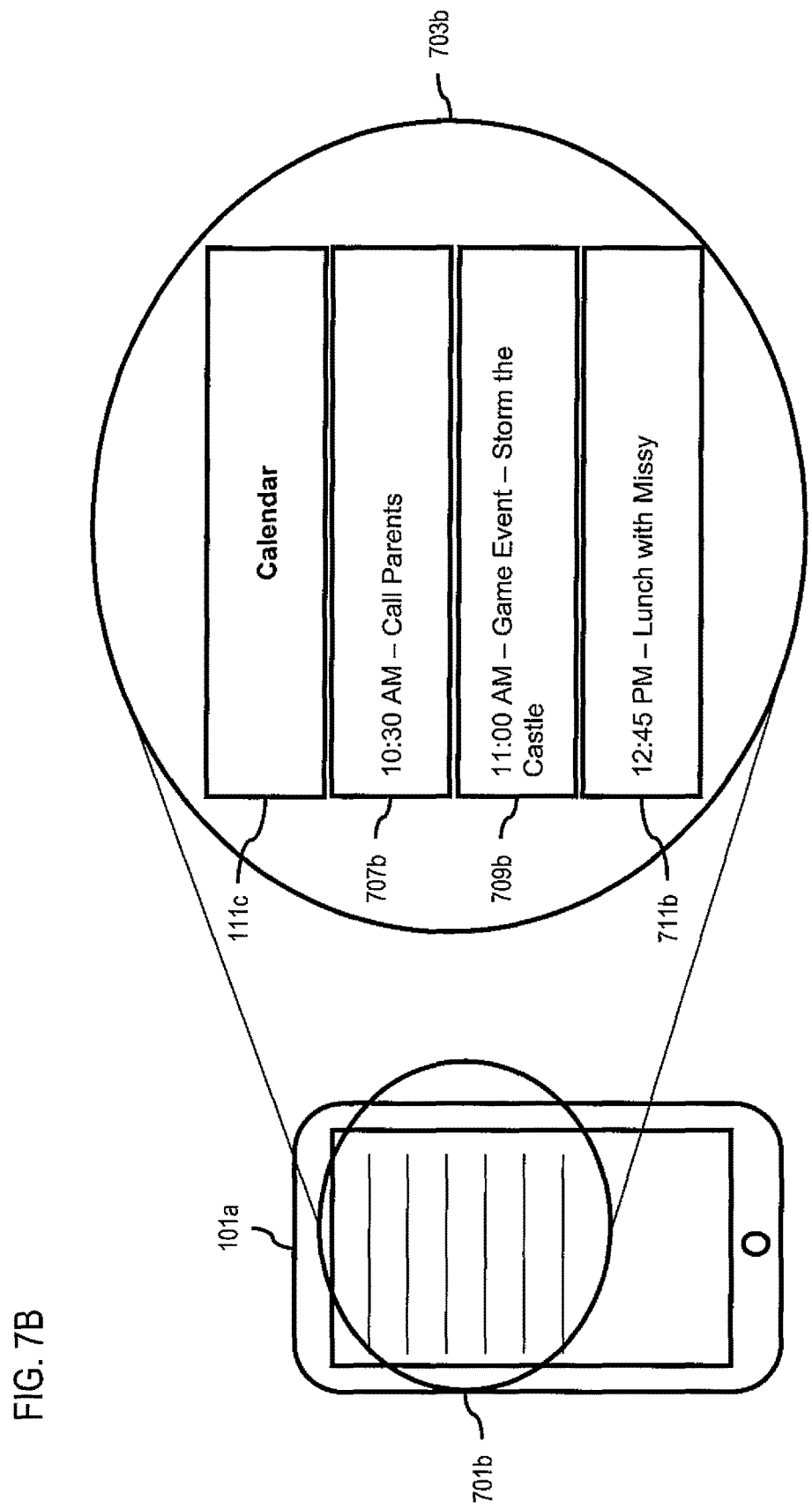

As illustrated in FIG. 7B, a UE 101*a* may be associated with a user interface 701*b* of a calendar application 111*c* that, as illustrated in the exploded view 703*b* of user interface 701*b*, includes appointments 707*b*, 709*b*, and 711*b*. As discussed above, the UE 101*a* may also be associated with content presented on another device (e.g., host device 117) such that information from the content may be presented on the UE 101*a*. By way of example, appointments 707*b* and 711*b* may be native appointments associated with the UE 101*a* prior to the UE 101*a* becoming associated with the content. However, appointment 709*a* may be associated with a virtual appointment from the content, such as an appointment with a non-player character in a game. As illustrated in the exploded view 703*b*, the various appointments 707*b*, 709*b*, and 711*b* are formatted identically and are indistinguishable except for the information they present. Thus, for example, there is no way for a user of the UE 101*a* to determine that the appointment 709*b* is associated with a virtual character from the content based on the user interface 701*b*. The seamless integration of the appointment 709*b* with the appointments 707*a* and 711*a* immerses the user of the UE 101*a* into the content.

Figure 7C:
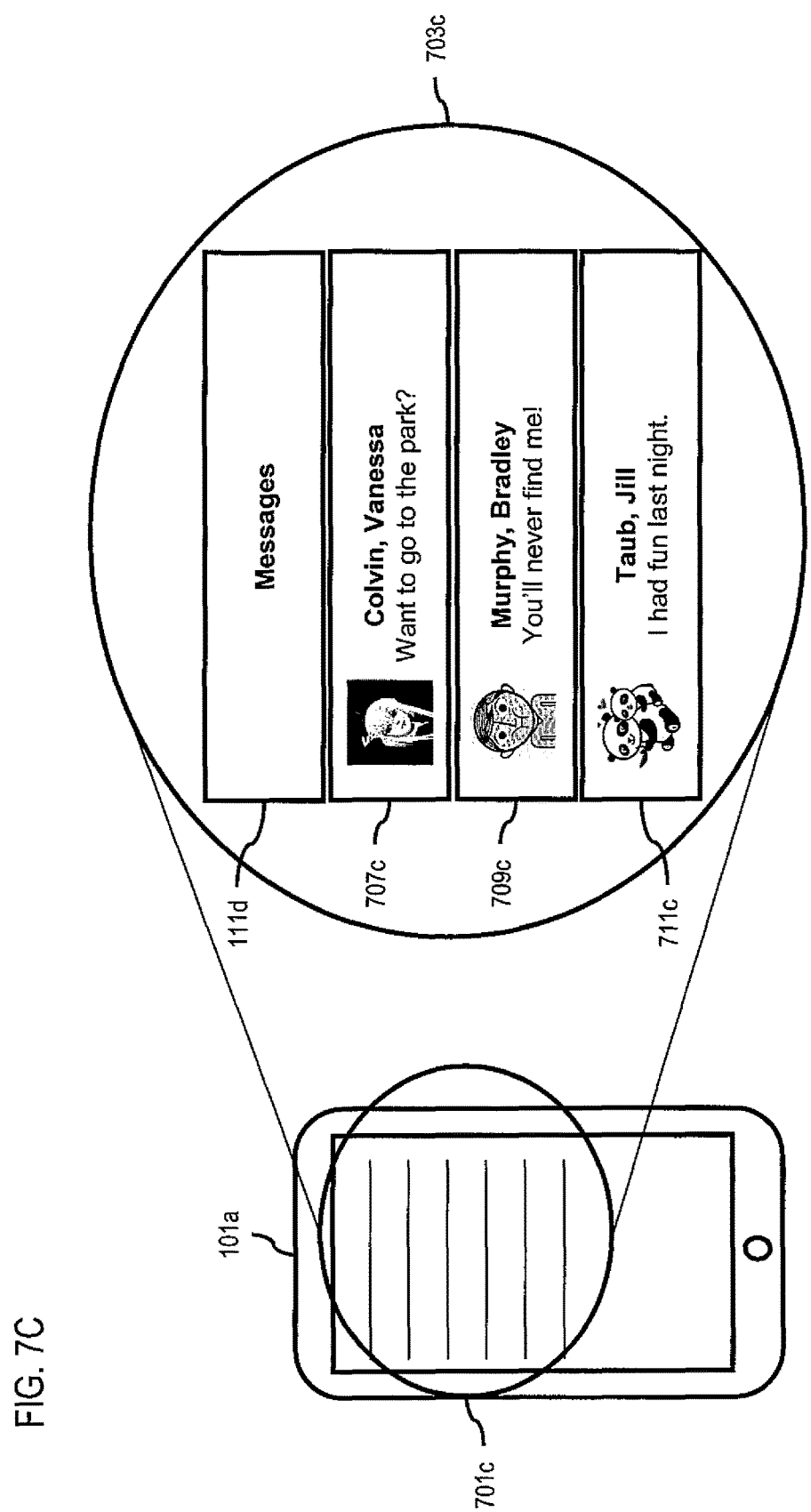

As illustrated in FIG. 7C, a UE 101*a* may be associated with a user interface 701*c* of a messaging application 111*d* that, as illustrated in the exploded view 703*c* of user interface 701*c*, includes messages 707*c*, 709*c*, and 711*c*. As discussed above, the UE 101*a* may also be associated with content presented on another device (e.g., host device 117) such that information from the content may be presented on the UE 101*a*. By way of example, messages 707*b* and 711*b* may be native messages associated with the UE 101a prior to the UE 101a becoming associated with the content. However, message 709a may be associated with a virtual message from within the content, such as a message from a non-player character in a game. As illustrated in the exploded view 703c, the various messages 707c, 709c, and 711c are formatted identically and are indistinguishable except for the information they present. Thus, for example, there is no way for a user of the UE 101a to determine that the message 709c is associated with a virtual character from the content based on the user interface 701c. The seamless integration of the message 709b with the messages 707a and 711a immerses the user of the UE 101a into the content.

Figure 7D:
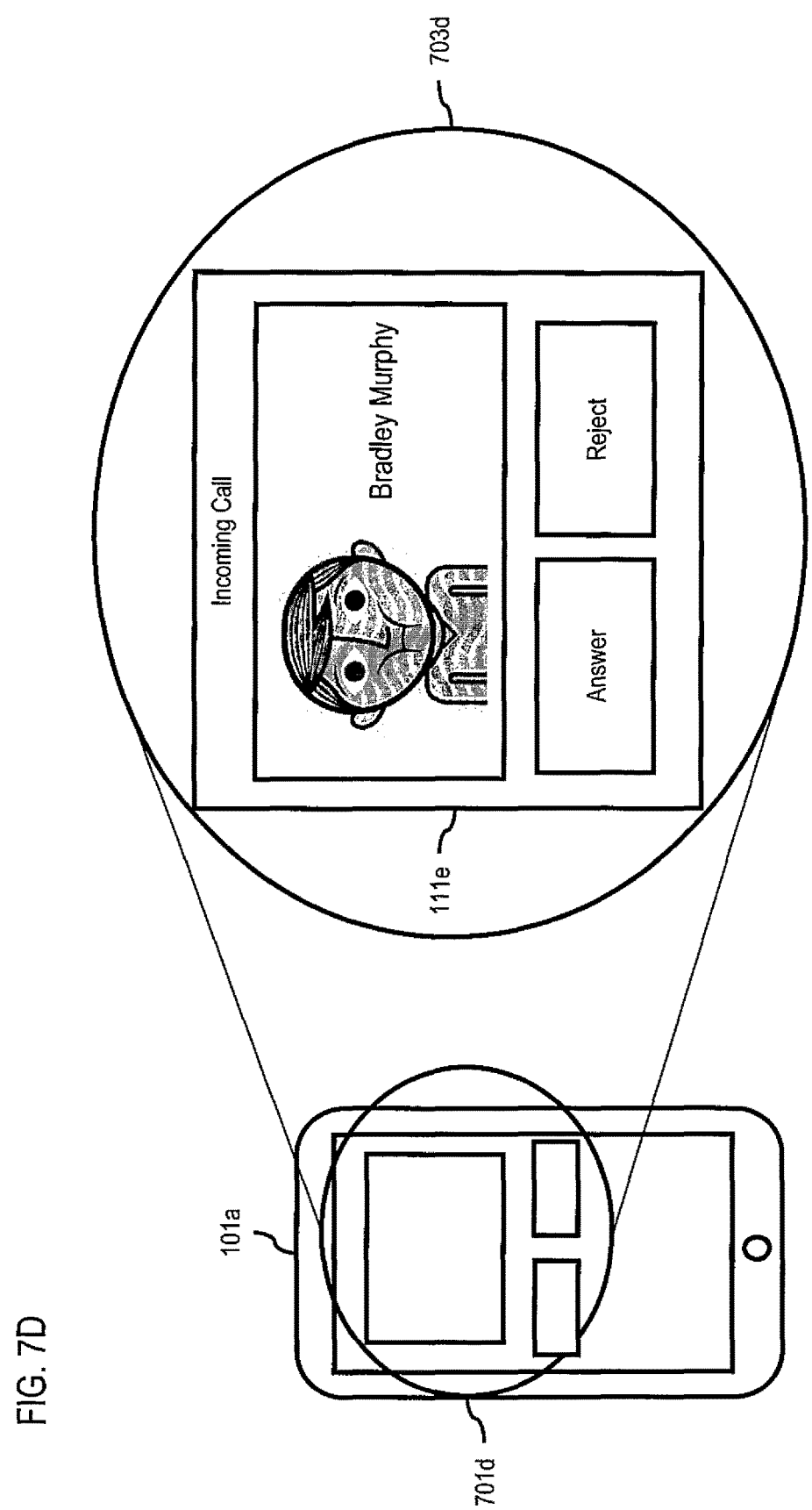

As illustrated in FIG. 7D, a UE 101a may be associated with a user interface 701d of a telephone application 111e that, as illustrated in the exploded view 703d of user interface 701d, an incoming call from Bradley Murphy. In one embodiment, Bradley Murphy may correspond to a virtual character included within the content. However, a transaction between the content and the UE 101a results in the user interface 701d corresponding to a virtual call from the virtual character Bradley Murphy. Because the application 111e looks identical as the application 111e would look if the UE 101a was receiving a call from a real person, and not a virtual character, there is no way for a user of the UE 101a to determine that the user interface 701d is associated with a virtual character from the content based. The seamless integration of the user interface 701d with within the UE 101a immerses the user of the UE 101a into the content.

Figure 7E:
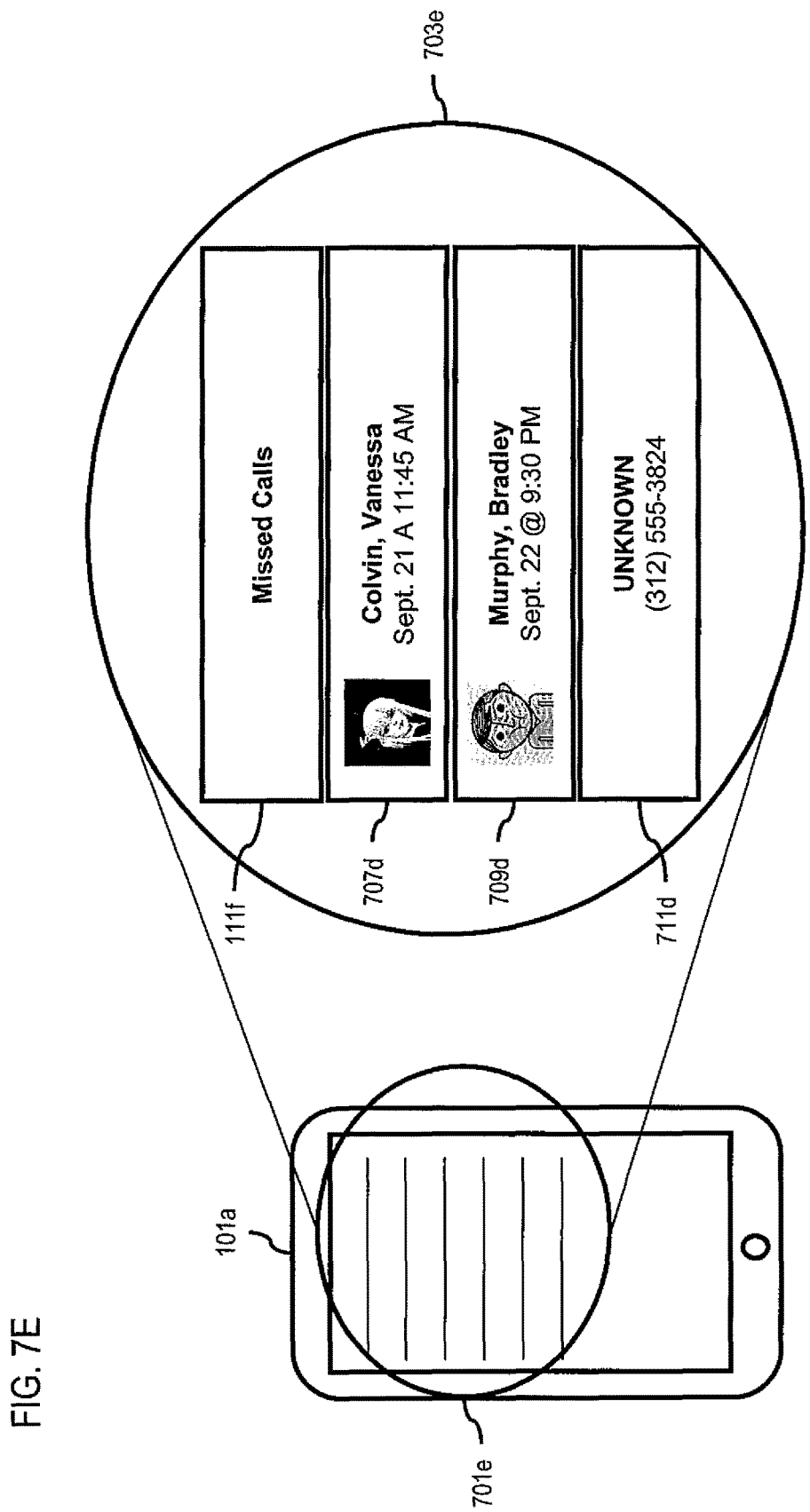

As illustrated in FIG. 7E, a UE 101a may be associated with a user interface 701e of a communications application 111f that, as illustrated in the exploded view 703e of user interface 701e, includes missed calls 707d, 709d, and 711d. As discussed above, the UE 101a may also be associated with content presented on another device (e.g., host device 117) such that information from the content may be presented on the UE 101a. By way of example, missed calls 707d and 711d may be native missed calls associated with the UE 101a prior to the UE 101a becoming associated with the content. However, missed call 709d may be associated with a virtual character from within the content, such as a missed call from a non-player character in a game. As illustrated in the exploded view 703e, the various messages 707d, 709d, and 711d are formatted identically and are indistinguishable except for the information they present. Thus, for example, there is no way for a user of the UE 101a to determine that the missed call 709c is associated with a virtual character from the content based on the user interface 701e. The seamless integration of the missed call 709b with the missed calls 707d and 711d immerses the user of the UE 101a into the content.

Figure 7F:
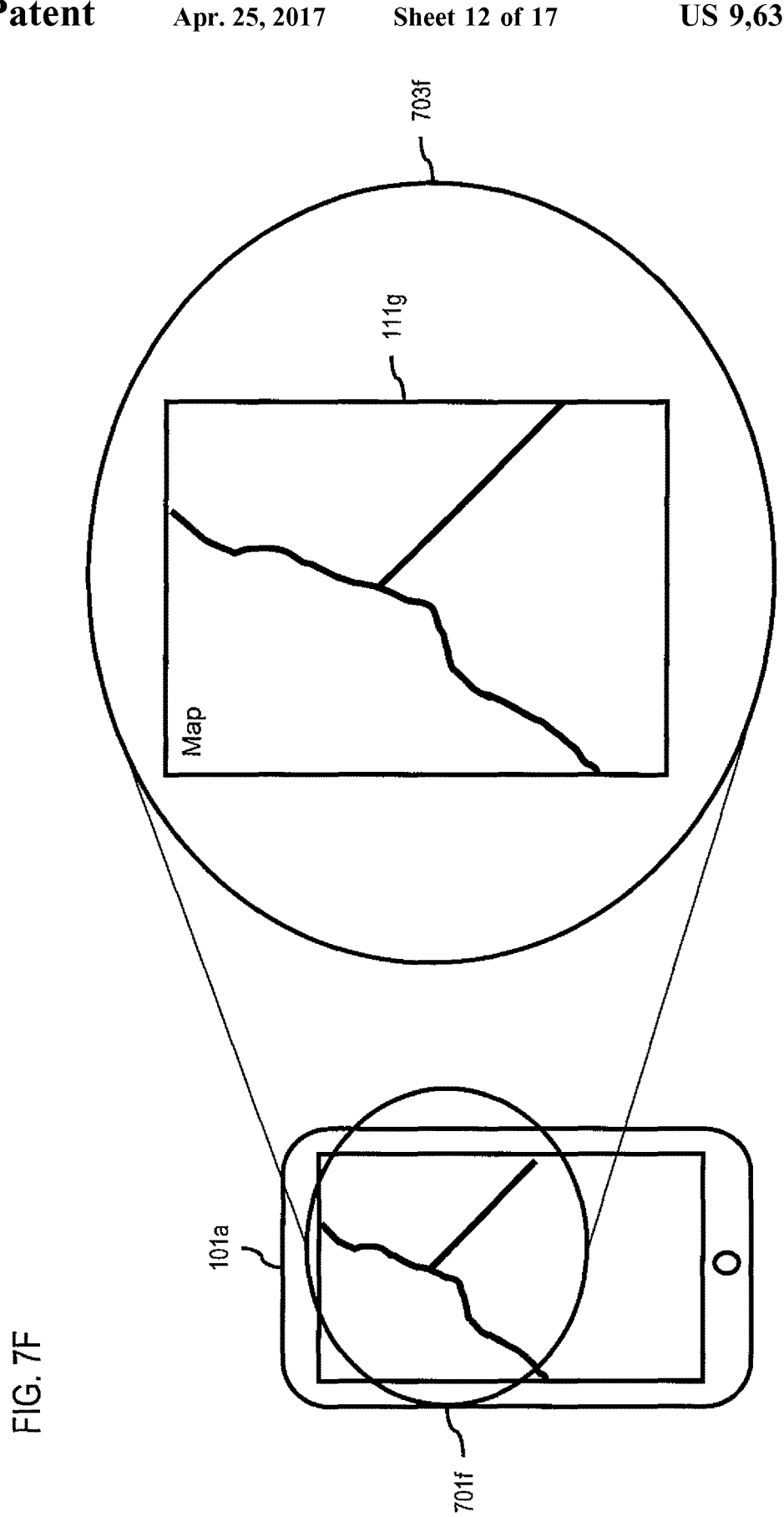
Figure 71:
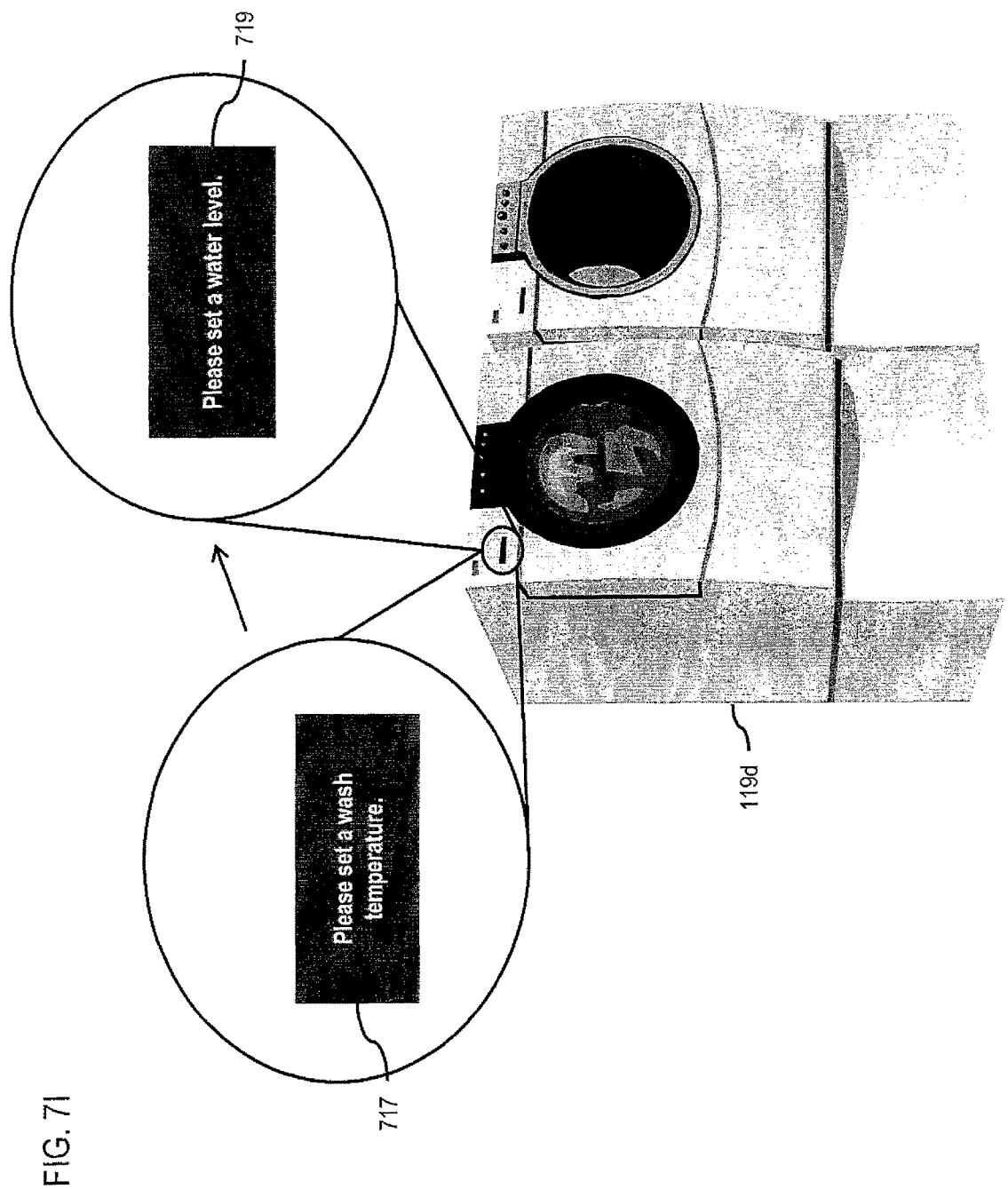

As illustrated in FIG. 7F, the UE 101a may be associated with a user interface 701f, which is illustrated in the exploded view 703f, that me be associated with a navigation application 111g. The navigation application 111g may be a native application on the UE 101abut currently displaying information associated with content presented from a host device. Thus, the user interface 701f may allow a user to navigate through a virtual world using the UE 101a that is otherwise unrelated to presenting the content to the user.

As illustrated in FIG. 7G, one example of an immersed device 119 may be a microwave oven 119b. The microwave oven 119b may include a user interface 713 that, based on one or more immersive interaction events associated with the presentation of content, may present a message associated with the content, such as TIME FOR POPCORN! As an example, such a message may be based on the beginning of the playback of a movie associated with a host device. Further, FIG. 7H illustrates another example of an immersed device 119, such as a refrigerator 119c. The refrigerator 119c may include a user interface 715 that, based on one or more immersive interaction events associated with content presented by a host device 117 that has interfaced with the refrigerator 119c, may display a message associated with an event within the content. For example, the content may be a movie that includes a character that may enjoy a drink at some point during the movie. The drink may be G's Soda Pop. At the time the character enjoys the drink, a control signal may be sent to the refrigerator 119c to add G's Soda Pop to a grocery list (e.g., Morn's Shopping List). In which, the control signal may be a form of advertising that is included in the content.

As illustrated in FIG. 7I, an immersed device 119, such as a washing machine/dryer combination 119d, may have a representation inserted into the content to have the content control the washing machine/dryer combination 119d. By way of example, the content may represent an instructional video for describing how to use the washing machine/dryer combination 119d. The content may include a scene describing how to set the wash temperature for the washing machine. The scene may include a control signal that is issued to the washing machine to prompt the user to enter, for example, a wash temperature, as illustrated by indicator 717. Once the user sets a wash temperature, the washing machine may issue a response to the control signal that corresponds to, for example, a response indicating that the wash temperature was set. Upon a host device 117 that is presenting the content receiving the response, the content may be advanced to the next scene that describes, for example, how to set the water level. The scene may include a control signal that is issued to the washing machine to prompt the user to, for example, enter a water level associated with a wash, as illustrated by indicator 719. Once the user sets a water level, the washing machine may issue a response to the control signal prompting the user to enter a water level that corresponds to, for example, a response indicating that the water level was set. Upon the host device 117 receiving the response, the content may be advanced to additional scenes that provide for training the user how to use the washing machine/dryer combination 119d. By having the content communicate with the washing machine/dryer combination 119d to issue control signals and receive responses, the user is immersed into the training video and is provided a better understanding of how to use the washing machine/dryer combination 119d.

The processes described herein for providing immersive interaction via everyday devices based on one or more immersive interaction events may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
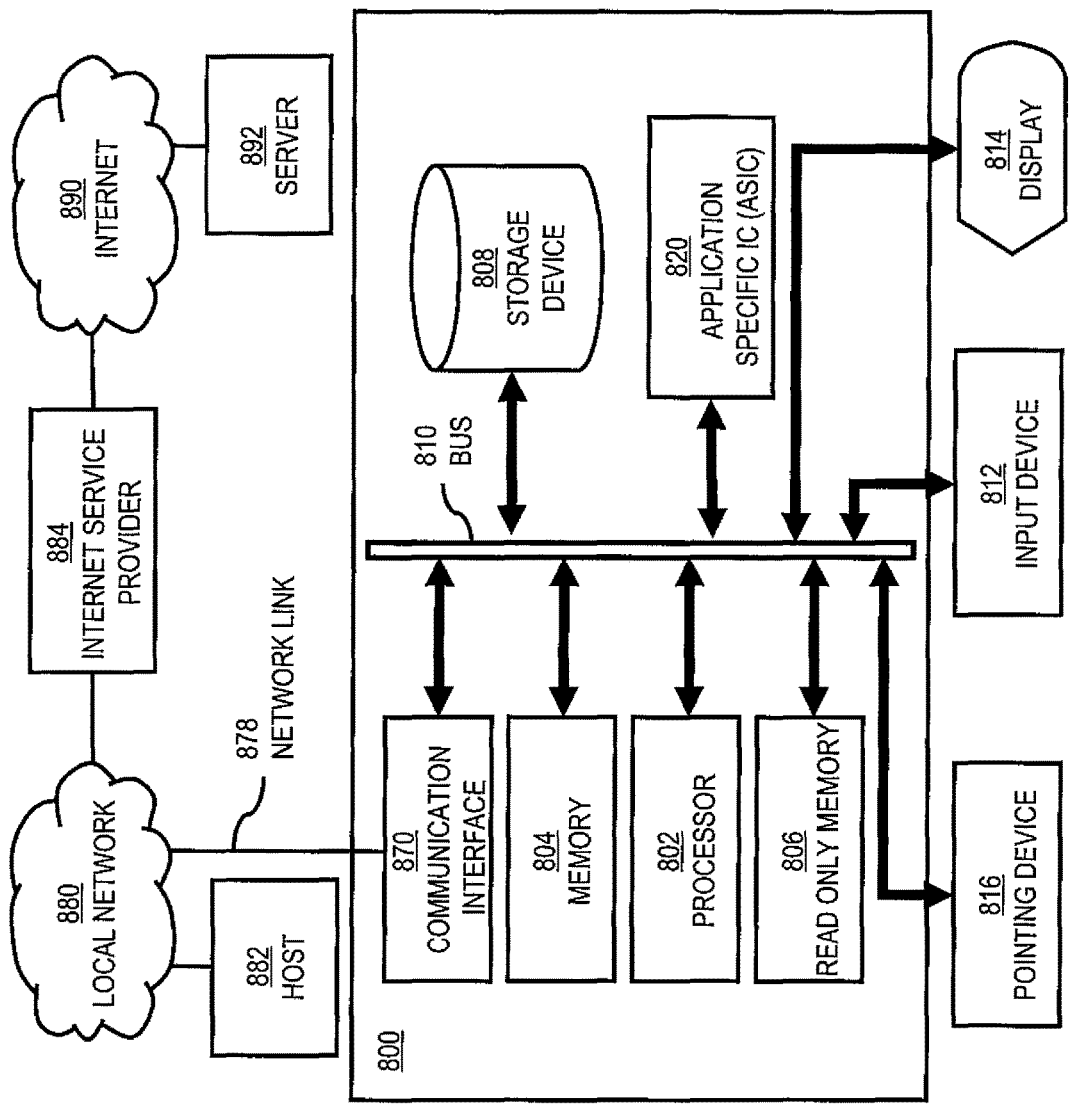
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions)

to provide immersive interaction via everyday devices based on one or more immersive interaction events as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing immersive interaction via everyday devices based on one or more immersive interaction events.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing immersive interaction via everyday devices based on one or more immersive interaction events. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing immersive interaction via everyday devices based on one or more immersive interaction events. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing immersive interaction via everyday devices based on one or more immersive interaction events, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for immersing the UE 101 into the presentation of content based on one or more immersive interaction events.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide immersive interaction via everyday devices based on one or more immersive interaction events as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing immersive interaction via everyday devices based on one or more immersive interaction events.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide immersive interaction via everyday devices based on one or more immersive interaction events. The memory 905 also stores the data associated with or generated by the execution of the inventive steps.

Figure 10:
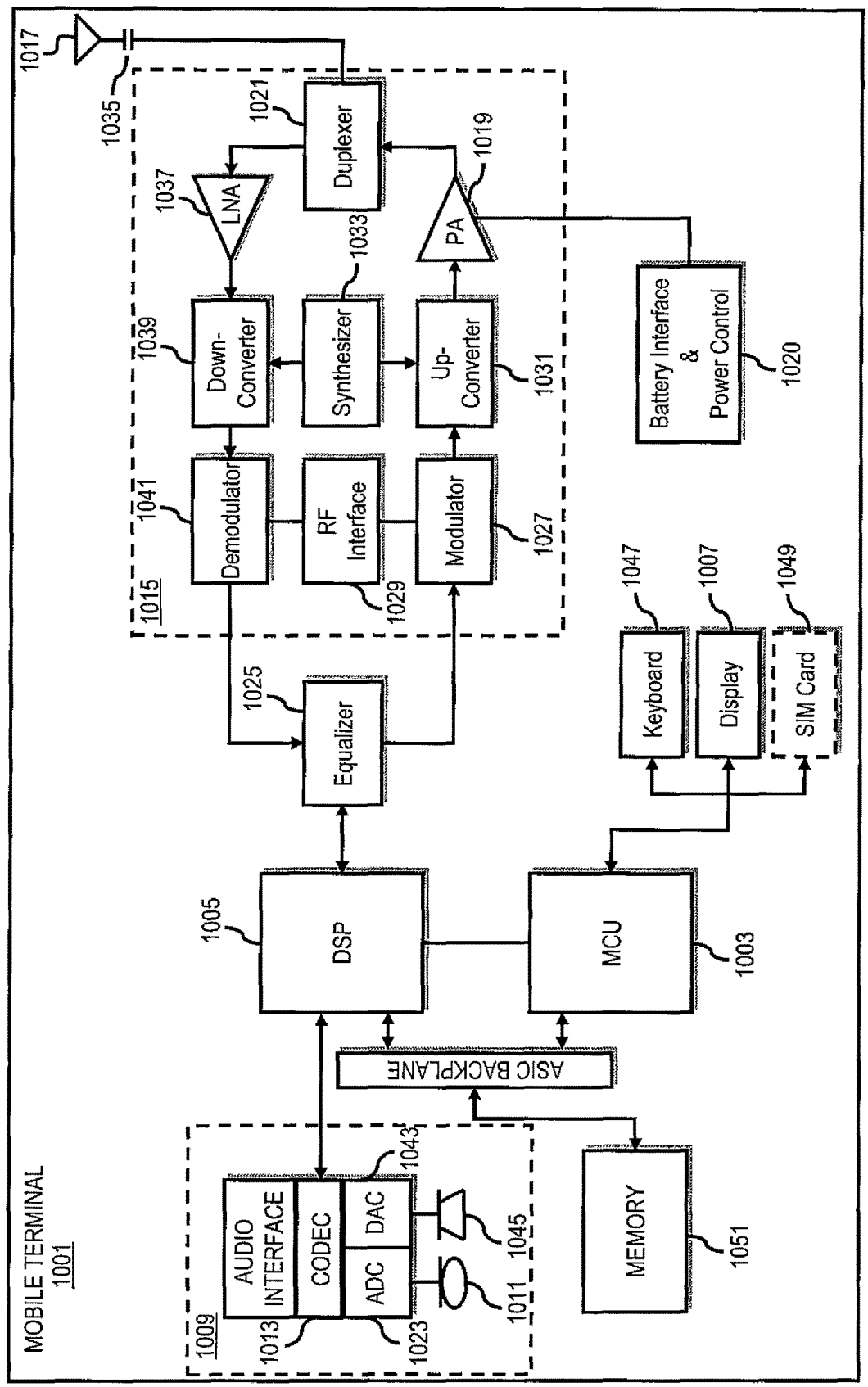
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of providing immersive interaction via everyday devices based on one or more immersive interaction events. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing immersive interaction via everyday devices based on one or more immersive interaction events. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide immersive interaction via everyday devices based on one or more immersive interaction events. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   processing, by an apparatus, content presented at a device, wherein the content is presented, at least in part, using a functionality of the device associated with the presenting of the content, to determine one or more interaction events between a user of the device and one or more virtual characters in a virtual world presented in the content;
   determining, by the apparatus, (a) one or more control signals for controlling the device, one or more other devices, or a combination thereof to initiate a presentation of the one or more interaction events in the virtual world; and (b) one or more protocols for transmitting the one or more control signals;
   initiating, by the apparatus, a transmission of the one or more control signals to the device, the one or more other devices, or a combination thereof, using the one or more protocols;
   initiating, by the apparatus, a combination of virtual information associated with the content with native information associated with the device, the one or more other devices, or a combination thereof, at one or more user interfaces associated with the device, the one or more other devices, or a combination thereof based, at least in part, on the one or more interaction events; and
   initiating, by the apparatus, a presentation of information of the one or more virtual characters and information of real world contacts of the user using an identical format in a contact application of the device,
   wherein the virtual information coincides with the native information, a format of the native information, or a combination thereof, associated with the device, the one or more other devices, or a combination thereof.

2. A method of claim 1, further comprising:
   initiating a presentation of information of the one or more interaction events between the user and the one or more virtual characters as well as information of real world events of the user using an identical format in a calendar application of the device,
   wherein the device, the one or more other devices, or a combination thereof have at least one functionality beyond a functionality for presenting, at least in part, the content, to interact with the content based on the one or more interaction events.

3. A method of claim 1, further comprising:
determining one or more capabilities of the device, the one or more other devices, or a combination thereof,
wherein the one or more interaction events, the one or more control signals, the one or more protocols, or a combination thereof are based, at least in part, on the one or more capabilities.

4. A method of claim 1, further comprising:
determining one or more virtual devices represented in the content; and
initiating a simulation of one or more actions, one or more functions, one or more characteristics, or a combination thereof associated with the one or more virtual devices at the device, the one or more other devices, or a combination thereof based, at least in part, on the one or more control signals.

5. A method of claim 4, further comprising:
initiating a synchronization of the one or more actions, the one or more functions, the one or more characteristics, or a combination thereof of the one or more virtual devices with an execution of the one or more control signals at the device, the one or more other devices, or a combination thereof.

6. A method of claim 4, further comprising:
in response to the one or more interaction events between the user and the one or more virtual characters,
initiating a presentation of virtual navigation through the virtual world on the device, based on one or more navigation applications on the device.

7. A method of claim 6, further comprising:
initiating a presentation of the one or more virtual communications and real world communications of the device using an identical format,
wherein the one or more virtual communications include one or more phone calls, one or more text messages, one or more multimedia messages, one or more emails, or a combination thereof.

8. A method of claim 1, further comprising:
initiating a querying of the one or more other devices, the device, or a combination thereof for one or more supported control signals, one or more supported protocols, or a combination thereof; and
determining the one or more control signals, the one or more protocols, or a combination thereof based, at least in part, on the one or more supported control signals, the one or more supported protocols, or a combination thereof.

9. A method of claim 1, further comprising:
initiating an insertion of one or more representations of the content into the device, the one or more other devices, or a combination thereof;
determining one or more interactions between the one or more representations of the content and the device, the one or more other devices, or a combination thereof; and at least one of processing or facilitating a processing of the one or more interactions to determine the one or more interaction events,
wherein the apparatus connects to the device via a network.

10. A method of claim 9, further comprising:
initiating a modification of the content, an interaction with the content, or a combination thereof based, at least in part, on the one or more interactions, the one to more interaction events, or a combination thereof.

11. A method of claim 9,
wherein the one or more other devices include one or more home appliances.

12. A method of claim 11,
wherein the one or more home appliances include a microwave oven, a refrigerator, a washing machine, a dryer, or a combination thereof.

13. An apparatus comprising:
circuitry including a hardware implementation comprising at least one processor or a portion of a processor and at least one memory including computer program code, the circuitry, when in operation, causing the apparatus to:
process content presented at a device, wherein the content is presented, at least in part, using a functionality of the device associated with the presenting of the content, to determine one or more interaction events between a user of the device and one or more virtual characters in a virtual world presented in the content;
determine (a) one or more control signals for controlling the device, one or more other devices, or a combination thereof to initiate a presentation of the one or more interaction events in the virtual world; and (b) one or more protocols for transmitting the one or more control signals;
initiate a transmission of the one or more control signals to the device, the one or more other devices, or a combination thereof, using the one or more protocols;
initiate a combination of virtual information associated with the content with native information associated with the device, the one or more other devices, or a combination thereof, at one or more user interfaces associated with the device, the one or more other devices, or a combination thereof based, at least in part, on the one or more interaction events; and
initiate a presentation of information of the one or more virtual characters and information of real world contacts of the user using an identical format in a contact application of the device,
wherein the virtual information coincides with the native information, a format of the native information, or a combination thereof, associated with the device, the one or more other devices, or a combination thereof.

14. An apparatus of claim 13, wherein the apparatus is further caused to: determine one or more capabilities of the device, the one or more other devices, or a combination thereof,
wherein the one or more interaction events, the one or more control signals, the one or more protocols, or a combination thereof are based, at least in part, on the one or more capabilities.

15. An apparatus of claim 13, wherein the apparatus is further caused to:
determine one or more virtual devices represented in the content; and
initiate a simulation of one or more actions, one or more functions, one or more characteristics, or a combination thereof associated with the one or more virtual devices at the device, the one or more other devices, or a combination thereof based, at least in part, on the one or more control signals.

16. An apparatus of claim 15, wherein the apparatus is further caused to:
initiate a synchronization of the one or more actions, the one or more functions, the one or more characteristics, or a combination thereof of the one or more virtual devices with an execution of the one or more control signals at the device, the one or more other devices, or a combination thereof.

17. An apparatus of claims 13, wherein the apparatus is further caused to:
   initiate a querying of the one or more other devices, the device, or a combination thereof for one or more supported control signals, one or more supported protocols, or a combination thereof; and
   determine the one or more control signals, the one or more protocols, or a combination thereof based, at least in part, on the one or more supported control signals, the one or more supported protocols, or a combination thereof.

18. An apparatus of claim 13, wherein the apparatus is further caused to:
   initiate an insertion of one or more representations of the content into the device, the one or more other devices, or a combination thereof;
   determine one or more interactions between the one or more representations of the content and the device, the one or more other devices, or a combination thereof; and at least one of process or facilitate a processing of the one or more interactions to determine the one or more interaction events.

19. An apparatus of claim 18, wherein the apparatus is further caused to:
   initiate a combination of virtual information associated with the content with native information associated with the device, the one or more other devices, or a combination thereof at one or more user interfaces associated with the device, the one or more other devices, or a combination thereof based, at least in part, on the one or more interaction events.

20. An apparatus of claim 19, wherein the virtual information coincides with the native information, a format of the native information, or a combination thereof associated with the device, the one or more other devices, or a combination thereof.

21. An apparatus of claim 18, wherein the apparatus is further caused to:
   initiate a modification of the content, an interaction with the content, or a combination thereof based, at least in part, on the one or more interactions, the one to more interaction events, or a combination thereof.

22. An apparatus of claim 18, wherein the apparatus is further caused to:
   in response to the one or more interaction events between the user and the one or more virtual characters,
   initiate a presentation of virtual navigation through the virtual world on the device, based on one or more navigation applications on the device.

* * * * *